(12) United States Patent
Hirezaki et al.

(10) Patent No.: US 7,302,541 B2
(45) Date of Patent: Nov. 27, 2007

(54) SYSTEM AND METHOD FOR SWITCHING ACCESS PATHS DURING DATA MIGRATION

(75) Inventors: Katsumi Hirezaki, Odawara (JP); Tetsuya Shirogane, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 11/041,115

(22) Filed: Jan. 21, 2005

(65) Prior Publication Data
US 2006/0107010 A1 May 18, 2006

(30) Foreign Application Priority Data
Nov. 18, 2004 (JP) ............................. 2004-334264

(51) Int. Cl.
G06F 12/00 (2006.01)
G06F 13/00 (2006.01)
G06F 13/28 (2006.01)

(52) U.S. Cl. ...................... 711/165; 711/154; 711/161; 711/162; 710/28

(58) Field of Classification Search ................ 711/161, 711/162, 153, 154, 156, 159, 165; 710/22, 710/23, 28; 714/7
See application file for complete search history.

(56) References Cited

U.S. PATENT DOCUMENTS

| | | | |
|---|---|---|---|
| 6,950,917 B2 * | 9/2005 | Nagasawa et al. .......... 711/165 |
| 7,127,558 B2 * | 10/2006 | Honda et al. ................ 711/114 |
| 7,130,941 B2 * | 10/2006 | Okada et al. .................. 710/74 |
| 2002/0004890 A1 * | 1/2002 | Ofek et al. .................. 711/161 |
| 2004/0049553 A1 * | 3/2004 | Iwamura et al. ............ 709/213 |
| 2006/0031651 A1 * | 2/2006 | Nonaka et al. ............. 711/163 |

FOREIGN PATENT DOCUMENTS

JP    2000-187608 A    7/2000

* cited by examiner

*Primary Examiner*—Donald Sparks
*Assistant Examiner*—Ryan Bertram
(74) *Attorney, Agent, or Firm*—Townsend and Townsend and Crew LLP

(57) ABSTRACT

The present invention suppresses the generation of redundant I/O and improves the response to the host during data migration. When migrating data from the migration source volume to the migration destination volume, the access destination of the host is switched to the second storage device. When data requested by the host has not yet been migrated, data is read from the first storage device. When the frequency of access to the non-migrated area reaches a prescribed value, the target IP address is changed and discovery is implemented so as to switch the access destination of the host to the first storage device. When the frequency of access to the migrated area in the first storage device reaches a prescribed value, the access destination of the host is switched to the second storage device. The access destination of the host is controlled based on the data migration state and access state, and the generation of redundant I/O can be suppressed.

18 Claims, 19 Drawing Sheets

FIG. 5(a)

| STORAGE MANAGEMENT TABLE | | ~T1 |
|---|---|---|
| TARGET NAME | IP ADDRESS | |
| TARGET 1 | ADDRESS 1 (MIGRATION SOURCE) | |
| ... | ... | |

FIG. 5(b)

| STORAGE MANAGEMENT TABLE | | ~T1 |
|---|---|---|
| TARGET NAME | IP ADDRESS | |
| TARGET 1 | ADDRESS 2 (MIGRATION DESTINATION) | |
| ... | ... | |

FIG. 5(c)

| STORAGE MANAGEMENT TABLE | | ~T1 |
|---|---|---|
| TARGET NAME | IP ADDRESS | |
| TARGET 1 | ADDRESS 1 (MIGRATION SOURCE) | |
| ... | ... | |

FIG. 6

| | DATA MIGRATION STATE MANAGEMENT TABLE | | ~T2 |
|---|---|---|---|
| | LBA | MIGRATION COMPLETE FLAG | |
| LUN#1 | LBA#1 | 1 | |
| | LBA#2 | 1 | |
| | LBA#3 | 1 | |
| | ... | ... | |
| | LBA#n | 0 | |
| LUN#2 | LBA | MIGRATION COMPLETE FLAG | |
| | LBA#1 | 0 | |
| | LBA#2 | 0 | |
| | LBA#3 | 0 | |
| | ... | ... | |
| | LBA#n | 0 | |
| ... | | | |

SYSTEM AND METHOD FOR SWITCHING ACCESS PATHS DURING DATA MIGRATION

CROSS-REFERENCE TO RELATED APPLICATIONS

This application relates to and claims priority from Japanese Patent Application No. 2004-334264 filed on Nov. 18, 2004, the entire disclosure of which is incorporated herein by reference.

BACKGROUND OF THE INVENTION

1. Field of the Invention

The present invention pertains to a storage system and a data migration method for a storage system.

2. Description of the Related Art

A storage system uses a memory device such as a hard disk drive and creates a memory area based on RAID (Redundant Array of Independent Disks). This physical memory area (logical volume), for example, is provided to a host computer (hereinafter referred to as a host) such as a server machine. The application program operating on the host provides information processing service to the client terminal connected to the host by writing data in the logical volume or reading data from the logical volume.

The data volume to be stored in the storage system is increasing day by day, and, depending on the type of data, there are cases where it is mandatory to store such data for a long period of time. Thus, in order to deal with the increasing demand, a new, high-capacity storage device is added.

When a high-capacity storage device is added to the storage system, data stored in the old, low-capacity storage device is migrated to the new, high-capacity storage device. As a method of migrating data from a certain storage device to another storage device, a method has been proposed for migrating data in a so-called online state without disrupting the service to the host (Japanese Patent Laid-Open Publication No. 2000-187608).

With a conventional storage system, the access destination of the host is switched to the storage device of the migration destination, and data migration is implemented between the storage devices. During data migration, the host accesses only the storage device of the migration destination to read and write the intended data. When data requested to be read from the host has already been copied to the storage device of the migration destination, the storage device of the migration destination will provide the data that it stores to the host.

Meanwhile, when data requested to be read from the host has not yet been copied to the storage device of the migration destination, the storage device of the migration destination read data from the storage device of the migration source and copies this in its own volume, and provides the acquired data to the host.

Therefore, when access is made to data not yet copied to the storage device of the migration destination, I/O (Input/Output) will be performed twice; that is, (i) data copy from the storage device of the migration source to the storage device of the migration destination, and (ii) data transmission from the storage device of the migration destination to the host. Thus, much time is required for providing the non-migrated data to the host, and the response of the storage system will deteriorate. Further, when the data migration between storage devices and the data communication between the storage device of the migration destination and the host respectively use the same communication network, wasteful data will flow on the network due to the I/O operation being conducted twice, and the network traffic will increase.

In particular, for instance, when the host is to distribute continuous data such as video data, the influence resulting from the generation of wasteful I/O operation will be significant. When a series of data groups is to be read out as with video data, if this series of data groups has not been copied to the storage device of the migration destination, the foregoing two I/O operations will be performed continuously. Therefore, the response of the storage device will deteriorate, the response of the service to be provided from the host to the client terminal will also deteriorate, and the network traffic will also increase.

SUMMARY OF THE INVENTION

Accordingly, an object of the present invention is to provide a storage system and a data migration system of a storage system capable of reducing wasteful data transfer by controlling the access destination of a host device based on the data migration state between storage devices. Another object of the present invention is to provide a storage system and a data migration system of a storage system capable of preventing the generation of a plurality of I/O operations regarding the same data by switching the access destination of the host device to the storage device of the migration source when access to data not yet copied to the storage device of the migration destination occurs frequently. Still another object of the present invention is to provide a storage system and a data migration system of a storage system capable of suppressing the generation of wasteful I/O operations and reducing the network traffic when the data migration between storage devices and the data communication between the host device and storage device use the same communication network. Other objects of the present invention will become clear from the description of the embodiments provided below.

In order to achieve the foregoing objects, the storage system of the present invention is a storage system in which a first storage device, a second storage device and a host device are mutually connected communicably, comprising: a data migration unit for migrating data stored in a first volume of the first storage device to a second volume of the second storage device; a data migration state management unit for managing the migration state of data from the first volume to the second volume; a first access request processing unit for processing the access request from the host device to the second volume; and a first switching indication unit for switching the access destination of the host device to the first storage device based on the access state to the non-migrated area in which data has not yet been migrated from the first volume to the second volume.

For instance, the first storage device, second storage device and host device may be mutually connected via an iSCSI (internet Small Computer System Interface) network. The first switching indication unit may be provided to the second storage device, and the second switching indication unit may be provided to the first storage device, respectively.

And, the first access request processing unit is capable of processing the access request from the host device while the data migration unit is migrating data from the first volume to the second volume. Thereby, data can be migrated without disrupting the service to the host device.

The first access request processing unit acquires data from the second volume and provides this to the host device when the access request from the host device is an access request to a migrated area in which data has been migrated to the second volume. Meanwhile, [the first access request processing unit] acquires data from the first volume and provides this to the host device when the access request from the host device is an access request to the non-migrated area.

Nevertheless, the first switching indication unit switches the access destination of the host device to the first storage device when the frequency of access from the host device to the non-migrated area reaches a first prescribed value. Thereby, for instance, in a case where sequential reading is required, by switching the access destination of the host device to the first storage device storing such data, the generation of wasteful I/O operations regarding non-migrated data can also be prevented.

A second access request processing unit for processing the access request from the host device to the first volume; and a second switching indication unit for switching the access destination of the host device from the first storage device to the second storage device based on the access state to the migrated area in which data has been transferred to the second volume among the access requests from the host device to the first volume may also be provided. In other words, in a case where the access destination of the high-level device is switched from the second storage device to the first storage device due to the frequent occurrence of the access request to the non-migrated area, when the host device frequently accesses the migrated area, the access destination of the host device is reswitched to the second storage device. Thereby, the generation of wasteful I/O operations regarding migrated data can also be suppressed.

Further, after the data migration unit completes the data migration, the second switching indication unit confirms whether the access destination of the host device is the first storage device or the second storage device, and switches the access destination of the host device to the second storage device when the access destination of the host device is the first storage device.

The first switching indication unit may also switch the access destination of the host device from the second storage device to the first storage device by copying the second constitution information of the second storage device to the first storage device, rewriting the first constitution information of the first storage device with the second constitution information, and providing a trigger signal for urging the redetection of the access destination to the host device.

For example, a storage management device for transmitting the trigger signal to the host device may also be provided, wherein the storage management device transmits the trigger signal to the host device by notifying the storage management device to the effect that the first constitution information of the first storage device has been rewritten with the second constitution information. Or, the trigger signal may be provided to the host device by logically disconnecting the connection of the second storage device and the host device.

For example, in the case of a storage system using iSCSI, a name server may be used as the storage management device. A name server associates and manages the target name (iSCSI name) and IP address (iSCSI address) of the respective nodes participating in the storage system. Here, the target name and IP address can be separated, and, as a result, even when the position within the network is changed, the host device is able to uniquely specify the target storage device by performing discovery. Discovery is processing for detecting a device connected to the network.

The host device makes an inquiry to the name server so as to detect the target storage device. Here, the second storage device is succeeding the first constitution information (IP address and soon) of the first storage device, and this succession is notified to the name server. Therefore, the name server notifies the host device to the effect that the IP address of the iSCSI target has been changed, and the host device switches the access destination based on such notification. The scheme of this switching can be employed in both cases of switching from the first storage device to the second storage device, and of switching from the second storage device to the first storage device.

Further, for example, the first storage device, the second storage device and the host device may be mutually connected in a two-way communicable manner via a switch; and the switch may be provided with at least the data migration state management unit and the first switching indication unit. As the switch, for example, a gigabyte-level Ethernet (registered trademark) switch may be used. Moreover, the second switching indication unit may be provided to the switch.

The data migration method for a storage system according to a different perspective of the present invention is a data migration method of migrating data from the first storage device to the second storage device in a storage system in which a first storage device, a second storage device and a host device are mutually connected communicably, comprising: a first switching step of switching the access destination of the host device from the first storage device to the second storage device; a data migration step of migrating data stored in a first volume of the first storage device to a second volume of the second storage device; a management step of managing the data migration state of data from the first volume to the second volume; an access request processing step of processing the access request from the host device to the second volume; a step of detecting the access state to the non-migrated area in which data has not yet been migrated from the first volume to the second volume; and a second switching step of switching the access destination of the host device from the second storage device to [the] first storage device based on the access state to the detected non-migrated area.

Further, a third switching step is provided after the second switching step, wherein the third switching step reswitches the access destination of the host device from the first storage device to the second storage device based on the access state to the migrated area in which data has been transferred to the second volume among the access requests from the host device to the first volume.

Moreover, a fourth switching step is provided after the third switching step, wherein, when the data migration is complete, the fourth switching step confirms whether the access destination of the host device is the first storage device or the second storage device, and switches the access destination of the host device to the second storage device when the access destination of the host device is the first storage device.

The functions, means and steps of the present invention, whether in whole or in part, may be constituted as a computer program to be executed, for example, with a microcomputer. And, this computer program can be fixed in a storage medium such as a hard disk, optical disk or semiconductor memory to be distributed. Or, the computer program may be distributed via a communication network such as the Internet.

BRIEF DESCRIPTION OF THE DRAWINGS

FIG. 5 is an explanatory diagram showing an example of the storage management table;

FIG. 6 is an explanatory diagram showing an example of the data migration state management table;

DESCRIPTION OF THE SPECIFIC EMBODIMENTS

Figure 1:
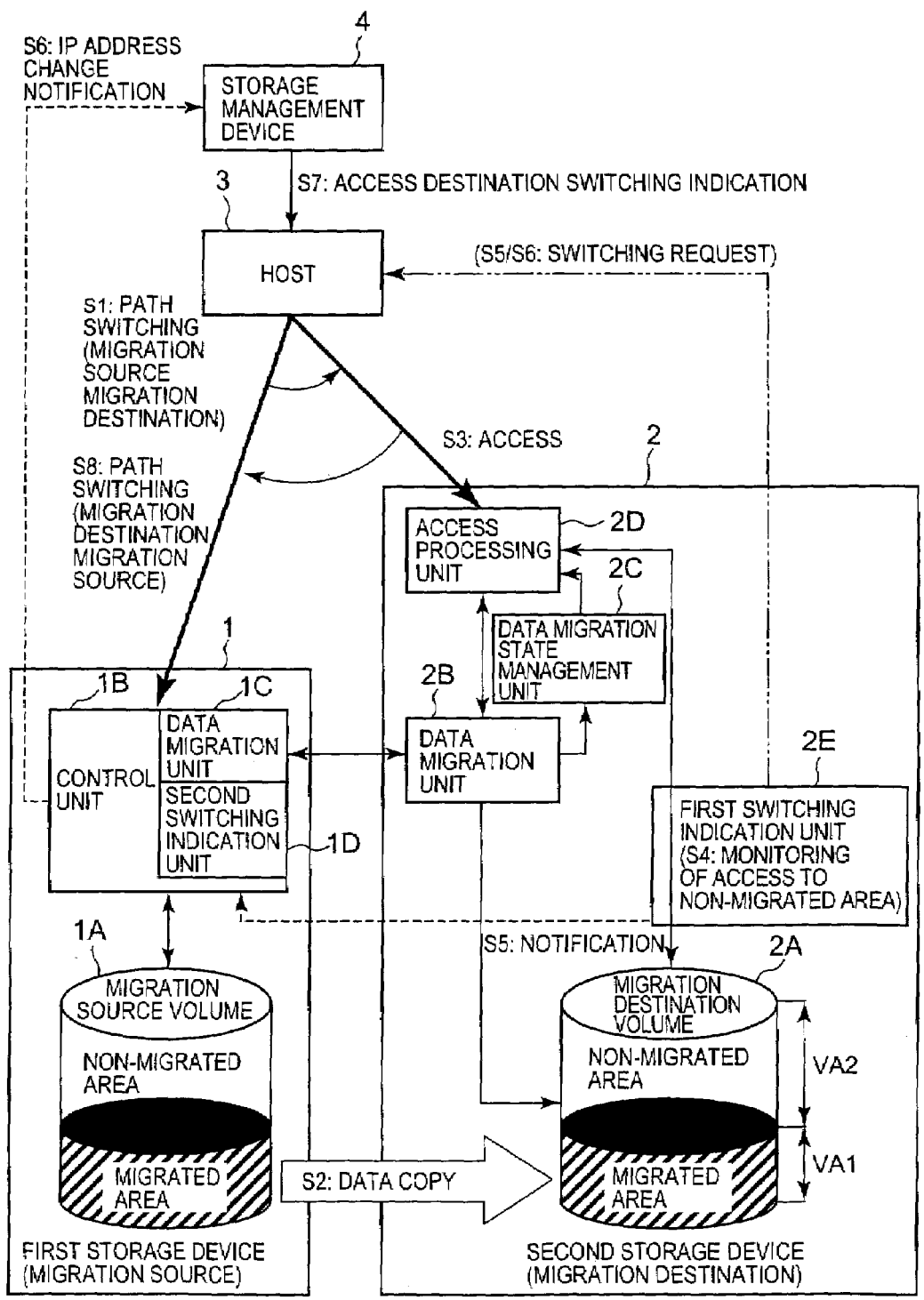
FIG. 1 is an explanatory diagram showing the concept of an embodiment of the present invention.

Embodiments of the present invention are now explained with reference to the drawings. FIG. 1 is an overall conceptual diagram of the present embodiment. Although described in detail later, as shown in FIG. 1, the storage system of the present embodiment has a first storage device 1, a second storage device 2, a host 3, and a storage management device 4, and, for example, the respective devices 1 to 4 are mutually connected via a communication network employing TCP/IP (Transmission Control Protocol/Internet Protocol) of the Internet or the like.

The first storage device 1 is the storage device of the data migration source, and, for instance, may comprise a migration source volume 1A, and a control unit 1B. Further, the control unit 1B may include a data migration unit 1C and a second switching indication unit 1D.

The second storage device 2 is the storage device of the data migration destination, and, for instance, may comprise a migration destination volume 2A, a data migration unit 2B, a data migration state management unit 2C, an access processing unit 2D, and a first switching indication unit 2E.

Among the above, 2B to 2E can be realized as a control function of the second storage device 2.

The host 3, for example, is a computer system constituted as a server machine, and is capable of accessing either the first storage device 1 or the second storage device 2 via a communication network. The host 3 provides information processing service such as video distribution to a client terminal not shown.

The storage management device 4 is a computer system for managing the target name (iSCSI name) and IP address (iSCSI address) of the respective storage devices 1, 2 participating in the storage system. The present embodiment illustrates an example of employing iSCSI.

When copying and migrating data retained in the first storage device 1 to the second storage device 2, the access destination of the host 3 is switched from the first storage device 1 to the second storage device 2 (S1).

For example, the constitution information is notified from the first storage device 1 to the second storage device 2, the IP address of the second storage device 2 is associated with the iSCSI target (target name), which is the access destination of the host 3, and the change of this IP address is notified to the storage management device 4. Thereby, the storage management device 4 will notify the host 3 to the effect that the IP address of the target has been changed, and the host 3, upon receiving such notification, will commence discovery. As a result of this discovery, the host 3 detects the target (second storage device 2), and switches the access destination to the second storage device 2.

After switching the access destination of the host 3 to the second storage device 2, data migration from the first storage device 1 to the second storage device 2 is commenced (S2). This data migration, for example, may be performed in two ways. One method is for the data migration unit 1C of the first storage device 1 to read data of the migration source volume 1A in a prescribed order, and copying this to the migration destination volume 2A of the second storage device 2. The other method is for the data migration unit 2B of the second storage device 2 to read data of the migration source volume 1A, and storing this in the migration destination volume 2A. Either method may be adopted, and either method is capable of migrating data without having to go through the host 3.

The migration state of data can be managed with the data migration state management unit 2C. Incidentally, although not shown in the drawings, it is also possible to manage the data migration state within the first storage device 1. The data migration state management unit 2C manages the state of which data has been copied to the migration destination volume 2A, and which data has not been copied to the migration destination volume 2A. For example, the data migration state can be managed by associating the address of each data to be migrated and the flag representing that [such data] has been migrated.

Even during the data migration, the host 3 is able to read and write intended data by accessing the second storage device 2 (S3). The access processing unit 2D processes the read request or write request from the host 3.

For example, in a case where a read request has been issued from the host 3, the access processing unit 2D uses the data migration state management unit 2C to determine whether the requested data has been copied to the migration destination volume 2A. The access processing unit 2D reads data from the migration destination volume 2A and transmits this to the host 3 when such data has been copied to the migration destination volume 2A.

Figure 3:
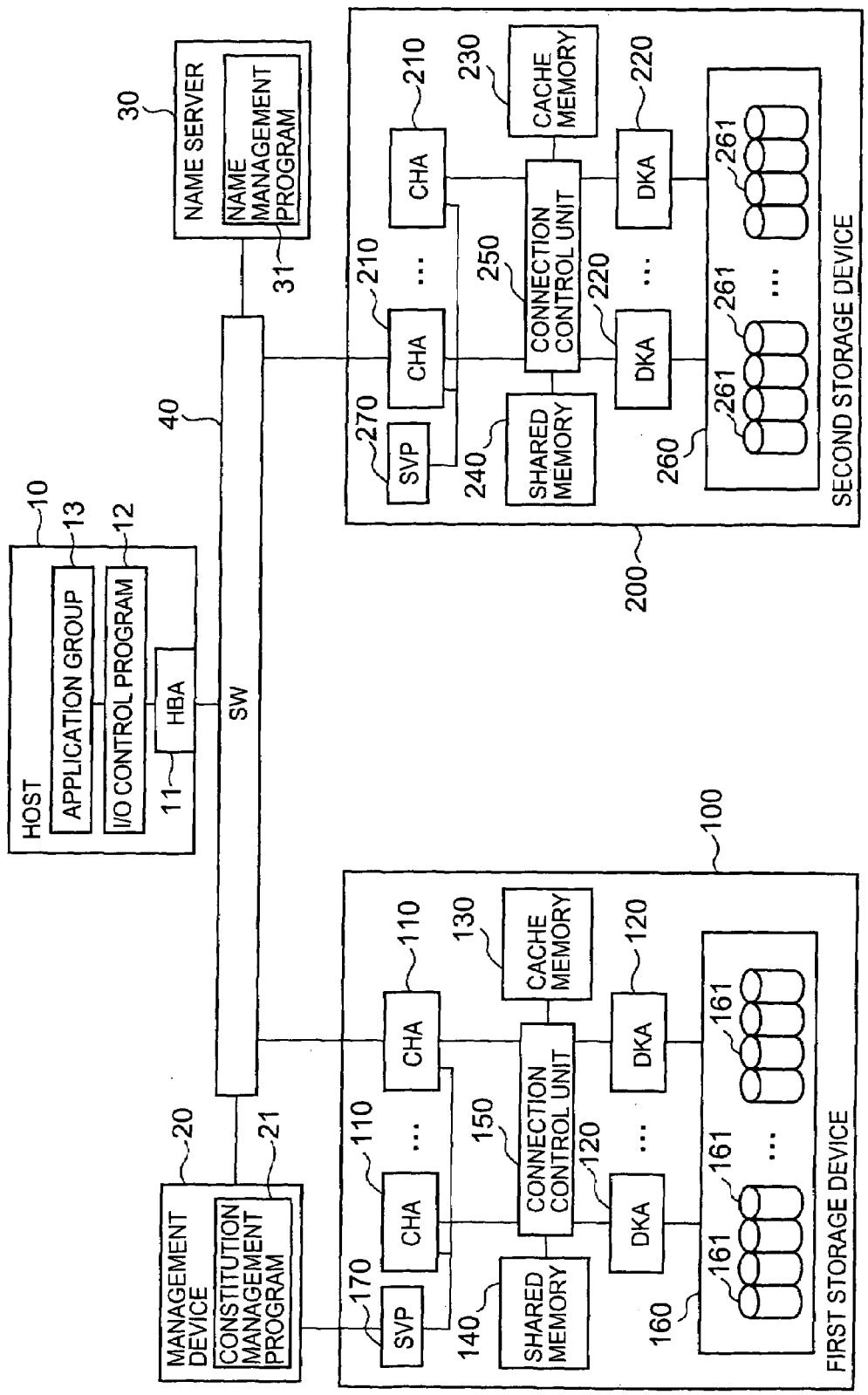
FIG. 3 is a block diagram showing a schematic constitution of the storage system.

Contrarily, when the data requested to be read from the host 3 has not been copied to the migration destination volume 2A, the access processing unit 2D reads the requested data from the migration source volume 1A, stores such read data in the migration destination volume 2A, and thereafter transmits this to the host 3. Incidentally, the writing of data in the volume (destage processing) may be performed after [such data] is transmitted to the host 3. In other words, after storing data in the cache memory (c.f. FIG. 3) of the second storage device 2, this data is transmitted to the host 3, and destage processing is performed at a prescribed timing.

Based on the data migration from the first storage device 1 to the second storage device 2, the migration source volume 1A and migration destination volume 2A can be classified into a migrated area VA1 and a non-migrated area VA2. Regarding which data of which address has been migrated or has not been migrated is managed with the data migration state management unit 2C.

The first switching indication unit 2E monitors the access frequency of the host 3 to the non-migrated area VA2 (S4), and, when access to the non-migrated area VA2 is made a prescribed number of times or more, [the first switching indication unit 2E] notifies this to the first storage device 1 (S5). This notification is for rewriting the constitution information, and, thereby, the IP address of the first storage device 1 can be associated with the target, which is the access target of the host 3. The first storage device 1 notifies the storage management device 4 to the effect that the IP address of the target has been changed (S6).

The storage management device 4 notifies the host 3 that the IP address of the target has been changed (S7). This IP address change notification triggers the commencement of discovery. The host 3 acquires a new IP address from the storage management device 4 for rediscovering the target, and switches the access destination to the first storage device 1 (S8).

As a result of switching the access destination, subsequent access to the non-migrated area VA2 will be made to the migration source volume 1A. Therefore, when the host 3 continuously accesses data of the non-migrated area VA2, it possible to prevent the generation of a plurality of I/O operations of this data being transmitted from the first storage device 1 to the second storage device 2, and further being transmitted from the second storage device 2 to the host 3.

Since the first storage device 1 is retaining all data to be migrated, it is able to independently process the access requests from the host 3. Nevertheless, when the host 3 frequently issues a read request regarding data of the migrated area VA1, as indicated in S1, the second switching indication unit 1D reswitches the access destination of the host 3 to the second storage device 2. As a result, data that has been migrated to the second storage device 2 can be provided from the second storage device 2 to the host 3.

As described above, the access destination of the host 3 is controlled in accordance with the data migration state and access state. And, when the data migration is complete, the second switching indication unit 1D confirms the access destination of the host 3, and switches the access destination of the host 3 to the second storage device 2 when the access destination of the host 3 is the first storage device 1. As a result, when the data migration is complete, the host 3 will only access the second storage device 2 of the migration destination to read or write intended data.

As described above, according to the present embodiment, service can be provided to the host 3 even during data migration, generation of redundant I/O operations can be suppressed, response to the host 3 can be improved, and the network traffic can be reduced. Embodiments of the present invention are now explained in further detail.

1. First Embodiment

Figure 2:
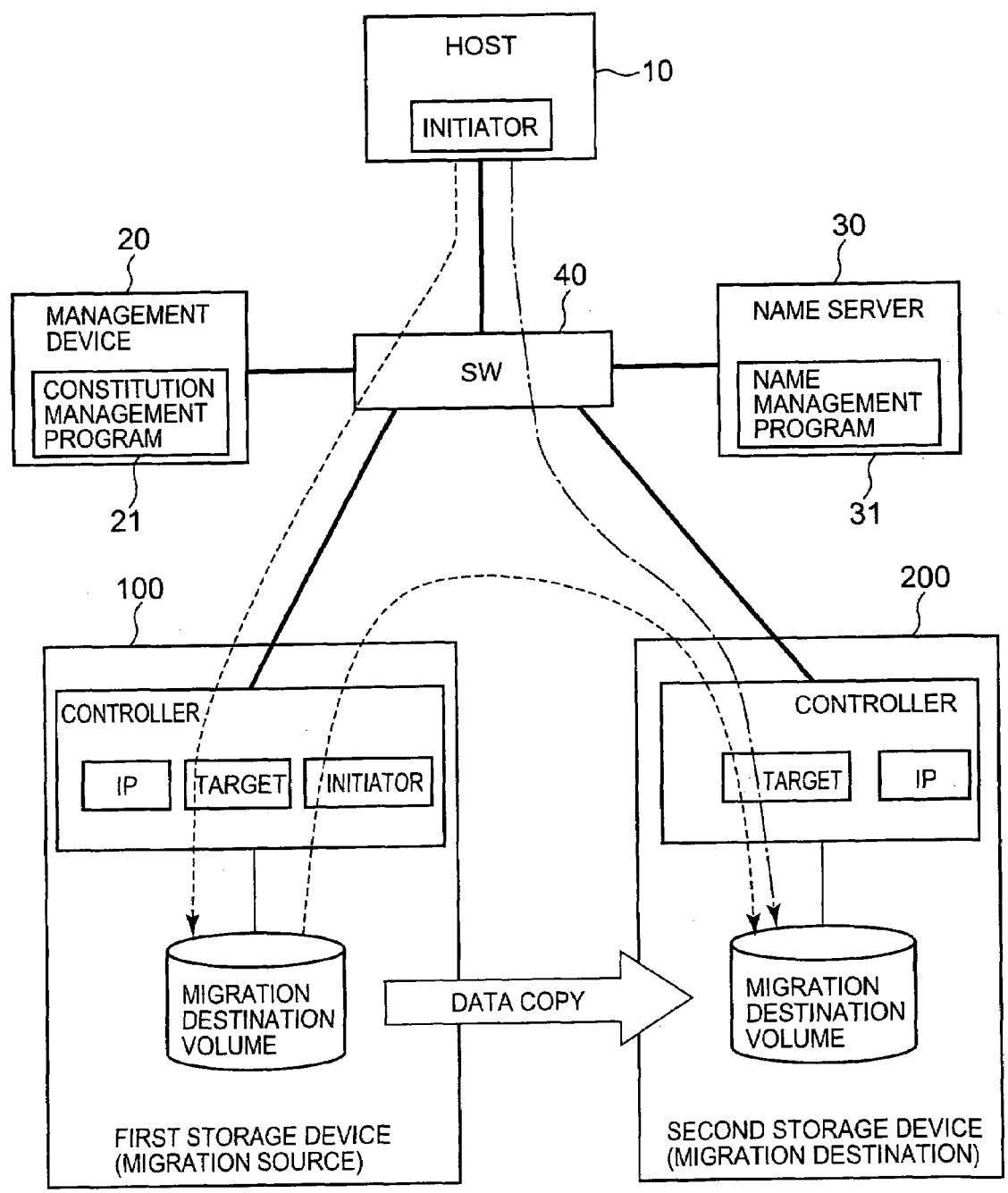
FIG. 2 is an explanatory diagram showing a frame format of the overall constitution of the storage system pertaining to the first embodiment.

FIG. 2 is an explanatory diagram showing a frame format of the overall constitution of the storage system. Although the respective constitutions will be described in detail later, this storage system may be constituted by comprising a host 10, a management device 20, a name server 30, a switch 40, a first storage device 100 and a second storage device 200. And, these respective devices 10, 20, 30, 100 and 200 are mutually connected via the switch 40, and, for example, enables data communication based on TCP/IP. In the present embodiment, illustrated is an example of a storage system employing iSCSI.

The host 10 is the iSCSI initiator, and accesses either the first storage device 100 or the second storage device 200 to read or write data. The host 10, for instance, is constituted as a server machine, and provides information processing service such as video distribution to a client terminal not shown.

The management device 20 gives various instructions to the first storage device 100, as well as acquires and manages the various states of the first storage device 100. The management device 20 comprises a constitution management program 21, and comprehends the constitutional status of the storage device under its control. Incidentally, in the following explanation, although the management device 20 manages the first storage device 100, the constitution may also be such that it manages the first storage device 100 and second storage device 200. Further, a device for managing the second storage device 200 may also be provided separately.

The name server 30 is a device for uniformly managing the iSCSI target of the storage system. The name server 30 comprises a name management program 31, and manages the IP address and the like of the respective storage devices 100, 200.

The first storage device 100 is a migration source storage device. The first storage device 100 acts as the iSCSI target in relation to the host 3, and acts as the iSCSI initiator in relation to the second storage device 200. In other words, the first storage device 100 implements the reading and writing of data stored in the migration source volume upon being accessed from the host 3 via the switch 40. Further, the first storage device 100, as the initiator, transmits data of the migration source volume to the second storage device 200, and copies this in the migration destination volume. This copy processing is executed without going through the host 3.

The second storage device 200 is a migration destination storage device. The second storage device 200, as the iSCSI target, is accessed by the host 3 or the first storage device 100. The second storage device 200 stores the data transmitted from the first storage device 100 in the migration destination volume.

Although explained in detail later, prior to the start of the data migration, the host 10 accesses the first storage device 100 to read or write the intended data. And, upon starting the copy of data from the first storage device 100 to the second storage device 200, the IP address of the target, which is the access destination, is changed, and, by the name server 30 notifying the host 10 of such change of IP address, the access destination of the host 10 is switched from the first storage device 100 to the second storage device 200.

FIG. 3 is a block diagram showing a more detailed constitution of the storage system. The host 10, for example, is constituted as a so-called open host. As such open host, for instance, employed may be a server machine loaded with a versatile OS (Operating System) such as Windows (registered trademark) or UNIX (registered trademark) and which accesses the storage devices 100, 200 via a relatively versatile communication protocol such as FC (Fibre Channel), iSCSI (Internet SCSI), TCP/IP (Transmission Control Protocol/Internet Protocol) or the like. The storage system of the present embodiment uses iSCSI to transmit and receive data.

The host 10, for example, may be constituted by comprising one or a plurality of HBAs (Host Bus Adapters) 11, an input/output (I/O) control program 12, and an application program group (abbreviated as "application group" in the drawings) 13. In FIG. 1, for ease of explanation, although only one host 10 is shown, it is also possible to provide a plurality of hosts 10.

The HBA 11 transmits and receives data based on a prescribed protocol. The I/O control program 12, for instance, is a driver program for controlling the input/output of data to be conducted with the HBA 11. The application program group 13, for example, is an email processing program or a program such as database management software, motion picture distribution software, or file system, and respectively provides a prescribed information processing service to the client terminal not shown.

The management device 20 is a device for collecting various types of information of the first storage device 100 via a service processor (SVP) 170 described later, or giving necessary commands to the first storage device 100. The management device 20 is connected to the SVP 170 via a communication network such as a LAN (Local Area Network). Further, the management device 20 may also be connected to the first storage device 100 via the switch 40. Incidentally, the management device 20 may also manage the constitution of the second storage device 200, or a separate management device may be provided for the second storage device 200.

The management device 20, for example, comprises a web browser-based GUI (Graphical User Interface), and, by logging onto the WWW (World Wide Web) server provided by the SVP 170, performs the collection of various types of information and input of commands. In the present embodiment, for example, the execution of data migration is ordered to the first storage device 100 via the management device 20.

The first storage device 100, for example, may be constituted by comprising a plurality of CHAs 110, a plurality of DKAs 120, a cache memory 130, a shared memory 140, a connection control unit 150, a memory unit 160, and a SVP 170.

A plurality of CHAs 100 may be provided to the first storage device 100. Each CHA 110 is a control package for controlling the data transfer with the host 10. Each CHA 110 comprises a plurality of communication ports, and is able to individually control the data transfer with a plurality of hosts 10. Further, a single CHA 110 is able to control the data communication with the second storage device 200.

A plurality of DKAs 120 may be provided to the first storage device 100. Each DKA 120 is for respectively controlling the data transfer with the memory unit 160. Each DKA 120, for example, by changing the logical block address (LBA) designated from the host 10 to the address of a physical disk, is able to access the respective disk drives 161 so as to read data or write data.

The cache memory 130 is used for storing the write data written from the host 10, or the read data read by the host 10. The cache memory 130, for example, may be constituted from a volatile or non-volatile memory. When the cache memory 130 is to be constituted by including a volatile memory, it is preferable to perform the memory backup with a battery power source or the like not shown. The cache memory 130, for example, may be constituted from two areas; namely, a read cache area and a write cache area. The write cache area, for example, contains a cache face and a NVS (Non-volatile Storage) face, and is able to subject write data to multiple storage (redundant storage).

The shared memory (also referred to as a control memory) 140, for example, maybe constituted from a non-volatile memory, or be constituted from a volatile memory. The shared memory 140, for example, stores control information or management information. Information such as the foregoing control information may be multiple-managed with a plurality of memories 140.

The shared memory 140 and cache memory 130 may be constituted as independent memory packages, or the cache memory 130 and shared memory 140 may be provided in the same memory package. Further, a part of the memory may be used as the cache area, and the other part may be used as the control area. In other words, the shared memory and cache memory may be constituted as the same memory or memory group.

The connection control unit 150 is used for mutually connecting each CHA 110, each DKA 120, the cache memory 130, and the shared memory 140. Thereby, every CHA 110 and DKA 120 will be able to individually access the cache memory 130 and shared memory 140. The connection control unit 150, for example, may be constituted with an ultra high-speed crossbar switch or the like. Incidentally, the CHA 110, DKA 120, cache memory 130 and shared memory 140 may be integrated into one or a plurality of controllers.

The memory unit 160 is constituted by comprising a plurality of disk drives 161. The memory unit 160 may be provided inside the same case together with the controller portion of each CHA 110 and each DKA 120, or may be provided inside a case separate from the controller portion.

The memory unit 160, for example, may be constituted to contain a mixture of a plurality of types of disk drives 161. As the disk drive 161, for example, a FC disk (fiber channel disk), SCSI (Small Computer System Interface) disk, SATA (Serial AT Attachment) disk and the like may be used. Incidentally, the type of disk is not limited to the above, and a memory device equivalent to the exemplified disk drives or a memory device that may be developed in the future can also be used.

Here, for example, a single parity group is constituted with a prescribed number of disk drives 161; for instance, a set of 3 or a set of 4, and at least one or more logical volumes may be set on the physical memory area provided by this parity group. And, this logical volume is associated with an LU (Logical Unit) so as to be recognized by the host 10 as an access target.

Incidentally, it is not necessary for the storage resource to be used by the first storage device 100 to exist entirely in the first storage device 100. The storage resource existing outside the first storage device 100 may be incorporated and used as though it is a personal storage resource.

The SVP 170 is connected to each CHA 110 (and each DKA 120), for instance, via an internal network such as a LAN. Although the SVP 170 is only connected to each CHA 110 in the drawing, this may also be connected to each DKA 120. The SVP 170 collects the various states inside the first storage device 100, and provides such states to the management device 20 without change or upon performing processing thereto.

The second storage device 200 may also comprise the same constitution as the first storage device 100. The second storage device 200, for example, may be constituted by comprising each CHA 210, each DKA 220, a cache memory 230, a shared memory 240, a connection control unit 250, a memory unit 260 having a plurality of disk drives 261, and an SVP 270. Since each of these components of 210 to 270 corresponds respectively to the components 110 to 170 described in the first storage device 100, redundant explanations thereof will be omitted.

Nevertheless, the second storage device 200 does not have to be the same constitution as the first storage device 100. The first storage device 100 and the second storage device 200 may respectively have different constitutions.

Figure 4:
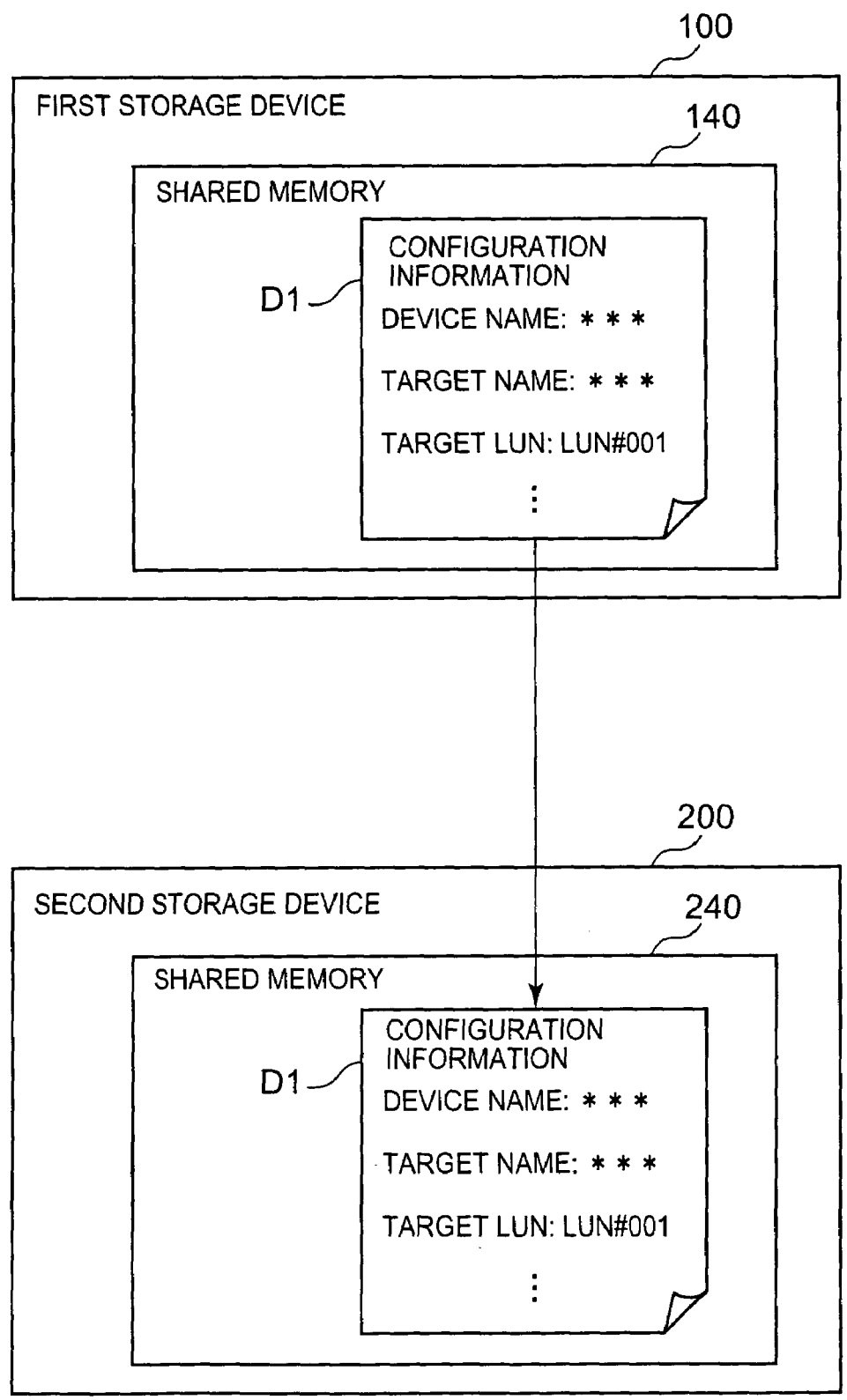
FIG. 4 is an explanatory diagram showing an example of the configuration information.

FIG. 4 is an explanatory diagram showing configuration information D1 as an example of the "configuration information". Configuration information D1 includes, for example, the device name, target name (iSCSI name), LUN (Logical Unit Number) of the access target and so on, and is stored in the shared memory.

As described later, the processing of switching the access destination of the host 10 is commenced by setting the configuration information of the storage device of the switching source in the storage device of the switching destination. For example, as shown in FIG. 4, when switching the access destination of the host 10 from the first storage device 100 to the second storage device 200, the configuration information D1 of the first storage device 100 is copied to the second storage device 200. As a result, the IP address of the second storage device 200 is associated with the target name or target LUN, and this change of IP address is notified to the name server 30.

Contrarily, when switching the access destination of the host 10 from the second storage device 200 to the first storage device 100, the configuration information D1 of the second storage device 200 is copied to the first storage device 100, and the IP address of the first storage device 100 is associated with the target name.

FIG. 5 is an explanatory diagram showing a portion of the schematic constitution of the storage management table T1. The storage management table T1 may be provided to the name server 30. As shown in FIG. 5(*a*), in the initial state of this embodiment, an IP address "address 1" of the first storage device 100 is associated with the target, which is the access destination of the host 10. In this initial state, the host 10 is accessing the first storage device 100.

FIG. 5(*b*) shows a state of the access destination of the host 10 being switched to the second storage device 200. The second storage device 200 notifies the name server 30 that the IP address of the target has been changed to "address 2". This "address 2" is the IP address of the second storage device 200. The name server 30 which received this notification, as shown in FIG. 5(*b*), rewrites the storage management table T1. Further, the name server 30 notifies the host 10 to the effect that the IP address of the target has been changed.

FIG. 5(*c*) shows a case of reswitching the access destination of the host 10 from the second storage device 200 to the first storage [device] 100. As described above, with the storage system of the present embodiment, the correspondence of the target and IP address is uniformly managed with the name server 30, and, when the IP address is changed based on the notification from the target device, this change of IP address is notified to the host 10, which is the initiator device.

FIG. 6 is an explanatory diagram showing a constitution example of the data migration state management table T2. This data migration state management table T2 may be provided to the first storage device 100 and/or the second storage device 200.

The data migration state management table T2, for example, manages, for each LUN, whether the data of each logical block address (LBA: Logical Block Address) contained in such LUN has been migrated to the second storage device 200. In the present embodiment, a migration complete flag is associated to each LBA. The migration complete flag is information for showing whether data has been migrated (copied) to the memory area of the migration destination, and "1" being set represents that [data] has been migrated. Incidentally, the management unit of the data migration state is not limited to LBA. For instance, a plurality of LBAs may be integrated as a group, and a migration complete flag may be set for each group.

Figure 7:
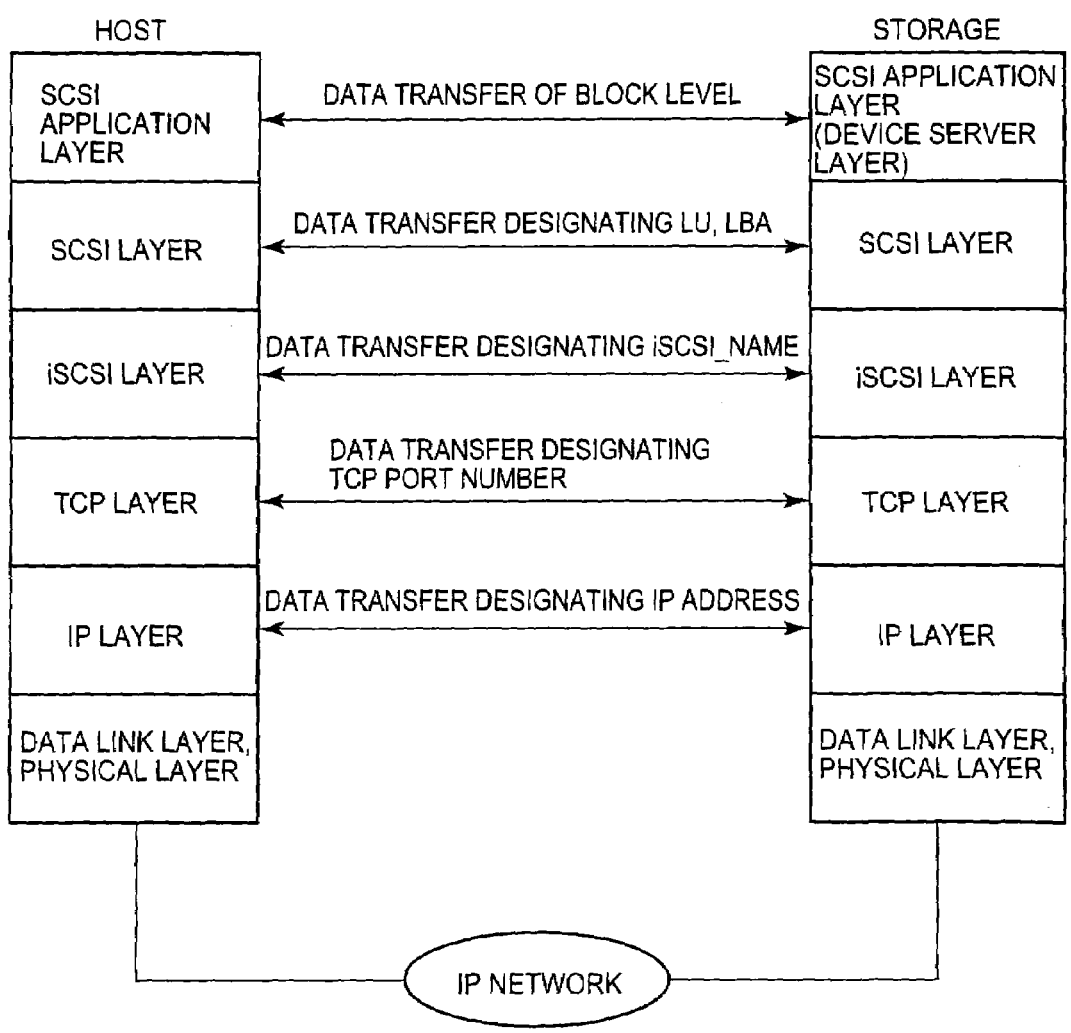
FIG. 7 is an explanatory diagram showing the protocol hierarchy of iSCSI.

FIG. 7 is an explanatory diagram showing the layered structure of iSCSI. In order from the bottom, a physical layer and data link layer, an IP layer, a TCP layer, an iSCSI layer, a SCSI layer, and a SCSI application layer are layered. In the IP layer, data transfer designating the IP address is conducted, and, in the TCP layer, data transfer designating the TCP port is conducted. In the iSCSI layer, data transfer designating the iSCSI_NAME is conducted, and, in the SCSI layer, data transfer designating the LU number or LBA (Logical Block Address) is conducted. The iSCSI layer exists between the SCSI layer and TCP layer, and, by housing the SCSI command and SCSI response in a capsule referred to as iSCSI_PDU, transfers data via TCP connection.

Figure 8:
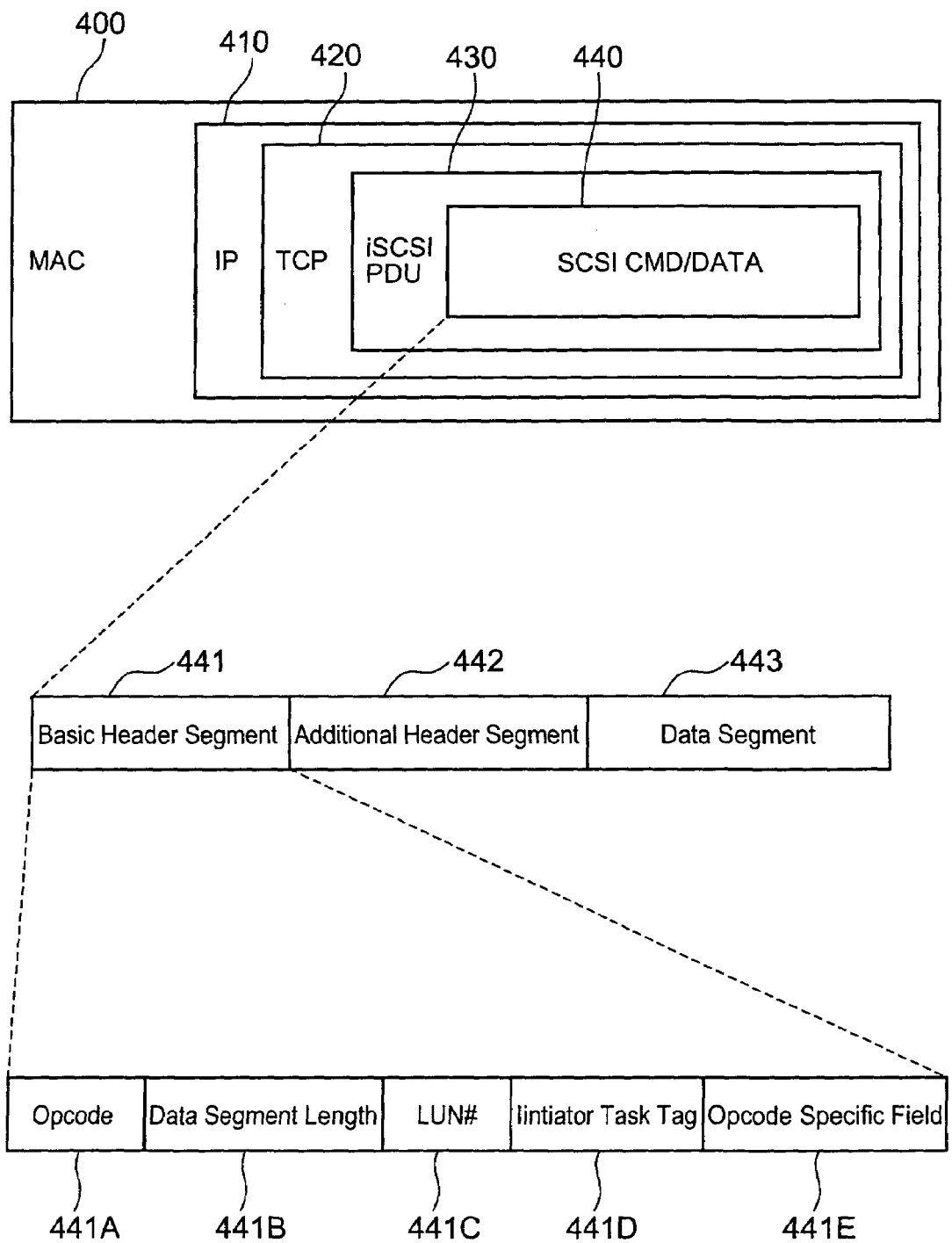
FIG. 8 is an explanatory diagram showing the data structure of iSCSI.

FIG. 8 is an explanatory diagram showing the data structure used in iSCSI. The command output from the SCSI application layer of the host 10 via the SCSI layer, as shown in FIG. 8, is a command frame 440 including commands and data (or only commands). The command frame 440, for example, is a 6-byte command frame in which the operation code such as the write command or read command is included in the top byte.

When this command frame 440 reaches the iSCSI layer, the iSCSI layer coverts the SCSI command frame into iSCSI_PDU (Protocol Data Unit) 430. When this PDU 430 passes through the TCP layer, this is converted into a TCP packet 420, and, when this TCP packet 420 passes through the IP layer, it becomes an IP packet 410. And, a MAC (Media Access Control) address is added to complete a variable-length MAC frame 400. 1500 bytes of data can be stored in the data field.

The SCSI command frame 440, for example, contains a basic header segment 441, an additional header segment 442, and a data segment 443. And, included in the basic header segment 441 may be, for example, an operation code 441A, a data segment length 441B, a LUN number 441C, an initiative task tag 441D, and an operation code specification field 441E.

With the constitution of the illustrated protocol, as a result of the physical layers and data link layers performing a session with each other, the IP layers performing a session with each other, the TCP layers performing a session with each other, the iSCSI layers performing a session with each other, the SCSI layers performing a session with each other, and the SCSI application layers performing a session with each other in order, the I/O request output from the host 10 can be respectively with each of the storage devices 100, 200.

For example, with the session among the physical layers and data link layers, as a result an ARP (Address Resolution Protocol) request being made and a corresponding ARP response being provided, their mutual MAC addresses can be acquired. With the session among the IP layers, as a result of a ping request being made and a corresponding ping response being provided, it will be possible to mutually confirm whether an opponent (IP address) exists.

With the session among the TCP layers, three packets are exchanged to synchronize the sequence numbers. With the session among the iSCSI layers, the iSCSI connection is established with a logon interface for exchanging the logon request and corresponding logon response (for example, the IP address, iSCSI_NAME of the logon requesting host, and TCP port number are used).

With the session among the SCSI layers, for example, a SCSI command such as a read command or write command is transmitted from the host 10 to either the first storage device 100 or second storage device 200. With the session among the SCSI application layers, write data is transmitted from the host 10 to either the first storage device 100 or second storage device 200, or, read data is transmitted from either the storage device 100 or 200 to the host 10.

Figure 9:
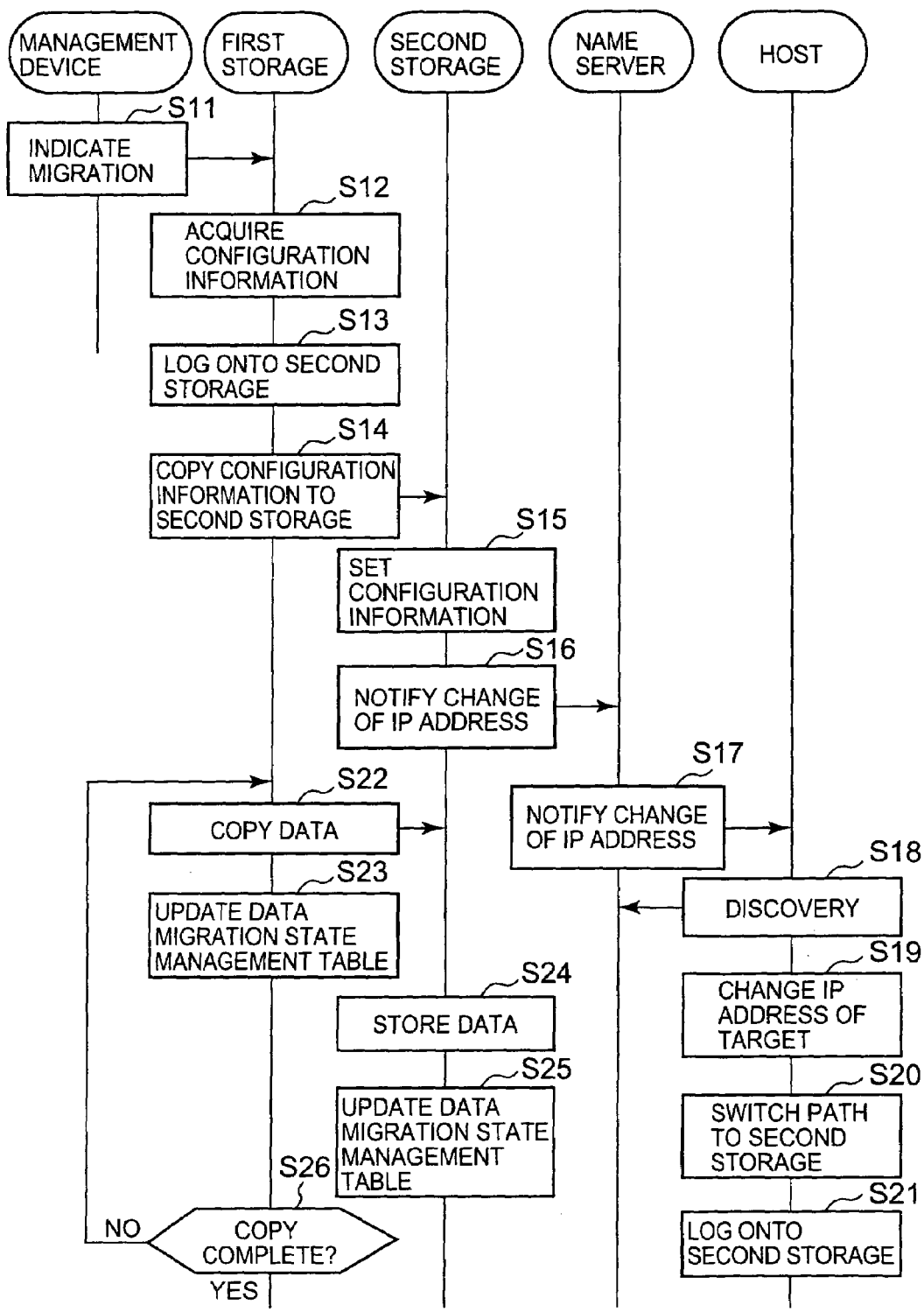
FIG. 9 is a sequence flowchart showing the overall data migration.

The operation of the present embodiment is now explained with reference to FIG. 9 to FIG. 14. Foremost, FIG. 9 is a schematic sequence showing the overall processing of data migration.

For example, a user such as a system administrator indicates the start of migration to the first storage device 100 via the management device 20 (S11). The indication of this start of migration, for example, may contain information or the like for respectively specifying the migration source volume and migration destination volume.

When the execution of migration is designated from the management device 20, as described together with FIG. 4, the first storage device 100 acquires its own configuration information (S12), logs onto the second storage device 200 (S13), and copies this configuration information to the second storage device 200 (S14).

The second storage device 200 personally sets this configuration information, associates the IP address of the second storage device 200 with the target name (S15), and notifies the name server 30 to the effect that the IP address has been changed (S16).

The name server 30, upon receiving the IP address change notification from the second storage device 200, updates the storage management table T1, and notifies the host 10 that the IP address of the target has been changed (S17).

The host 10, upon receiving the IP address change notification from the name server 30, commences discovery (S18), and acquires the new IP address of the target from the name server 30. And, the host 10 rewrites the IP address set in the access destination information with the IP address of the second storage device 200 (S19), switches the access destination to the second storage device 200 (S20), and logs onto the second storage device 200 (S21). Subsequently, the host 10 will be able to read and write data to and from the second storage device 200.

Figure 10:
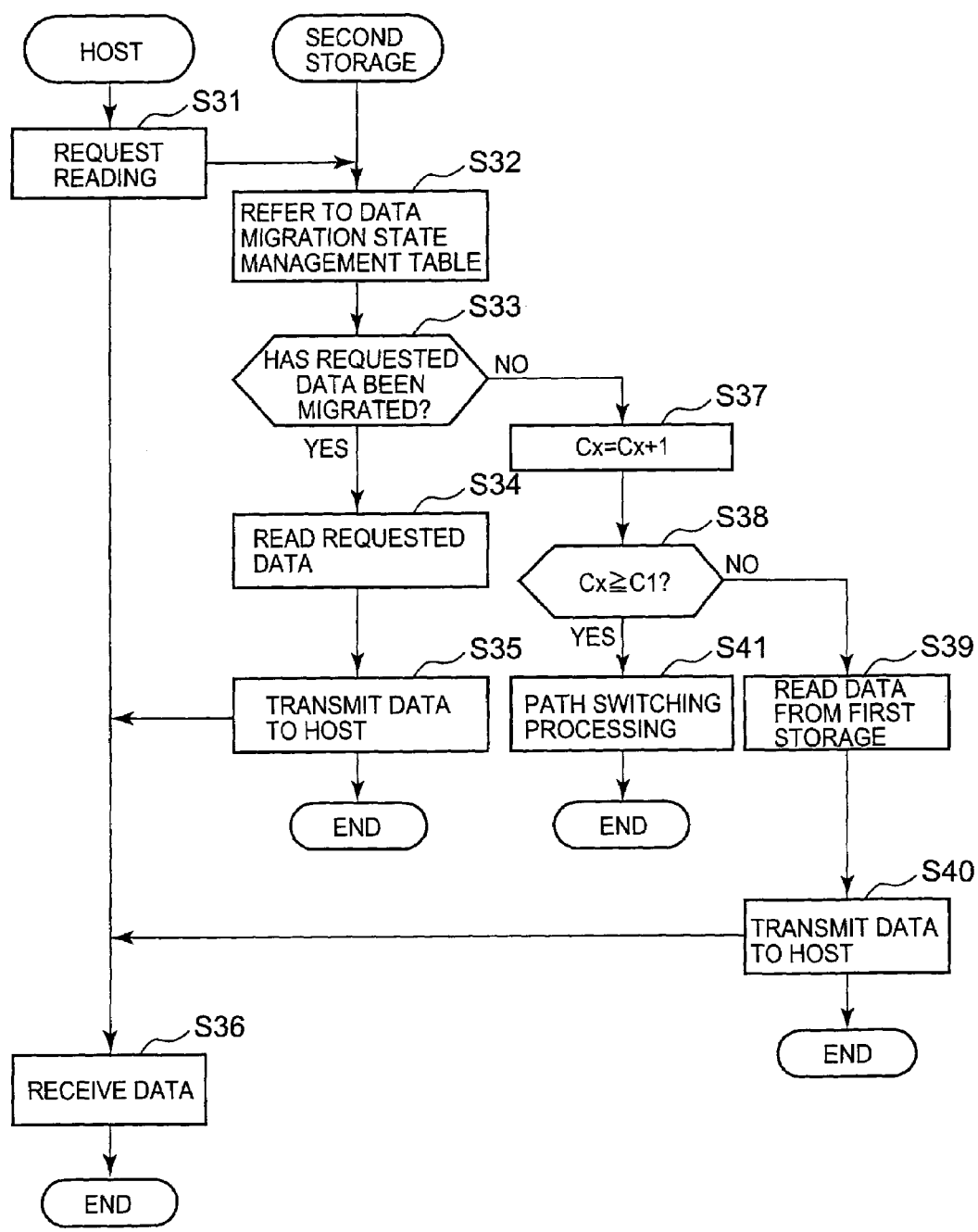
FIG. 10 is a flowchart showing the read processing to a non-migrated area.

FIG. 10 is a flowchart showing the processing in a case when the host 10 issues a read request of data to the second storage device 200.

When the host 10 designates LBA or the like and issues a read request (S31), the second storage device 200 refers to the data migration state management table T2 (S32), and determines whether the requested data has been migrated to the second storage device 200 (S33).

When the requested data has been migrated to the second storage device 200 (S33: YES), the second storage device 200 reads such data (S34), and transmits this to the host 10 (S35). The host 10 receives data transmitted from the second storage device 200 (S36).

Meanwhile, when data requested from the host 10 has not yet been migrated to the second storage device 200 (S33: NO), the second storage device 200 increments 1 to the value of counter Cx for counting the number of accesses to the non-migrated area (S34). The second storage device 200 determines whether the counter Cx has reached a prescribed value C1 (S38), and, when Cx has not reached C1, reads the requested data from the first storage device 100 (S39), and transmits this to the host 10 (S40).

Meanwhile, when the number of accesses (Cx) by the host 10 to the non-migrated area has reached the prescribed value C1 (S38: YES), the second storage device 200 commences the path switching processing for switching the access destination of the host 10 to the first storage device 100 (S41). The path switching processing will be explained in detail later with reference to FIG. 12.

Incidentally, although it has been explained that the path switching processing is performed when the number of accesses (Cx) by the host 10 to the non-migrated area has reached the prescribed value C1, this is not limited thereto, and, for example, the path switching processing may be performed when the access to the non-migrated area continues to be over the prescribed value C1. Thereby, for instance, the access destination of the host 10 can be switched based on the continuous readout (sequential access) of video data or the like.

Figure 11:
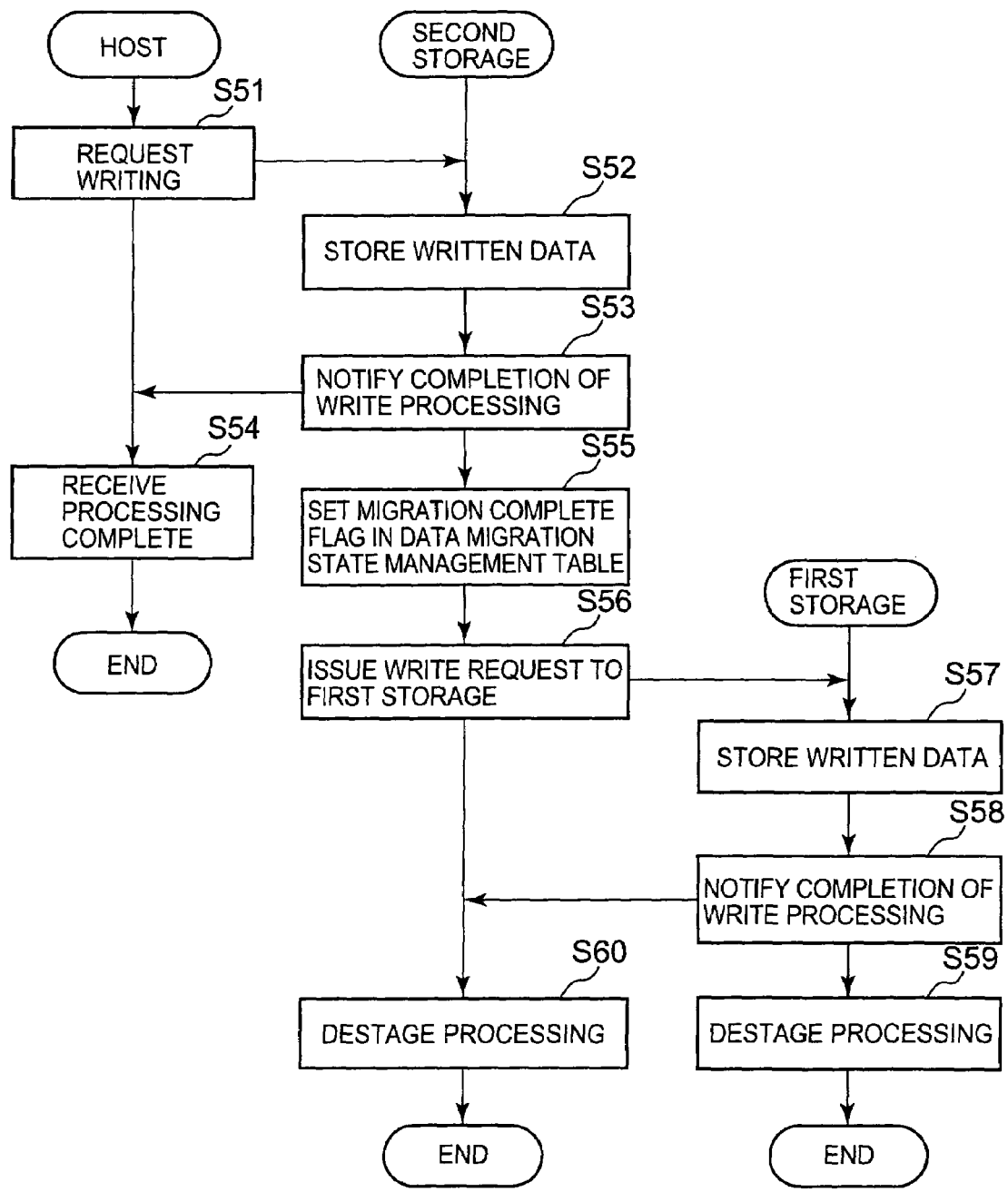
FIG. 11 is a flowchart showing the write processing.

FIG. 11 is a flowchart showing the processing in a case where the host 10 requests the second storage device 200 to update the data. When the host 10 designates LBA or the like and issues a write request (S51), the second storage device 200 stores the write data in the cache memory 230 (S52), and notifies the host 10 of the completion of the write processing (S53). The host 10 receives the processing complete notification of the write command and ends the processing routine (S54).

The second storage device 200 sets the migration complete flag corresponding to the write data to "1", and updates the data migration state management table T2 (S55). Next, the second storage device 200 issues a write request to the first storage device 100 so as to reflect the write data received from the host 10 to the volume of the migration source (S56).

The first storage device 100 stores the write data received from the second storage device 200 in the cache memory 130 (S57), and notifies the completion of write processing to the second storage device 200 (S58). The first storage device 100 executes the destage processing for writing the write data in a prescribed disk drive 161 (S59).

When the second storage device 200 completes writing the data in the first storage device 100, it executes the destage processing for writing the write data in a prescribed disk drive 261 (S60).

As described above, when the host 10 writes write data in the second storage device 200 of the migration destination, by reflecting this write data also in the first storage device 100 of the migration source, the stored content of the migration source volume and migration destination volume can be matched. Therefore, even in a case where the non-migrated area is accessed frequently and the access destination of the host 10 is switched from the second storage device 200 to the first storage device 100, the conformity of data can be maintained. Incidentally, in FIG. 11, although an example was illustrated in which the completion notification of the write processing and the destage processing are executed asynchronously, depending on the case, the completion notification of the write processing may be conducted after the completion of the destage processing.

Figure 12:
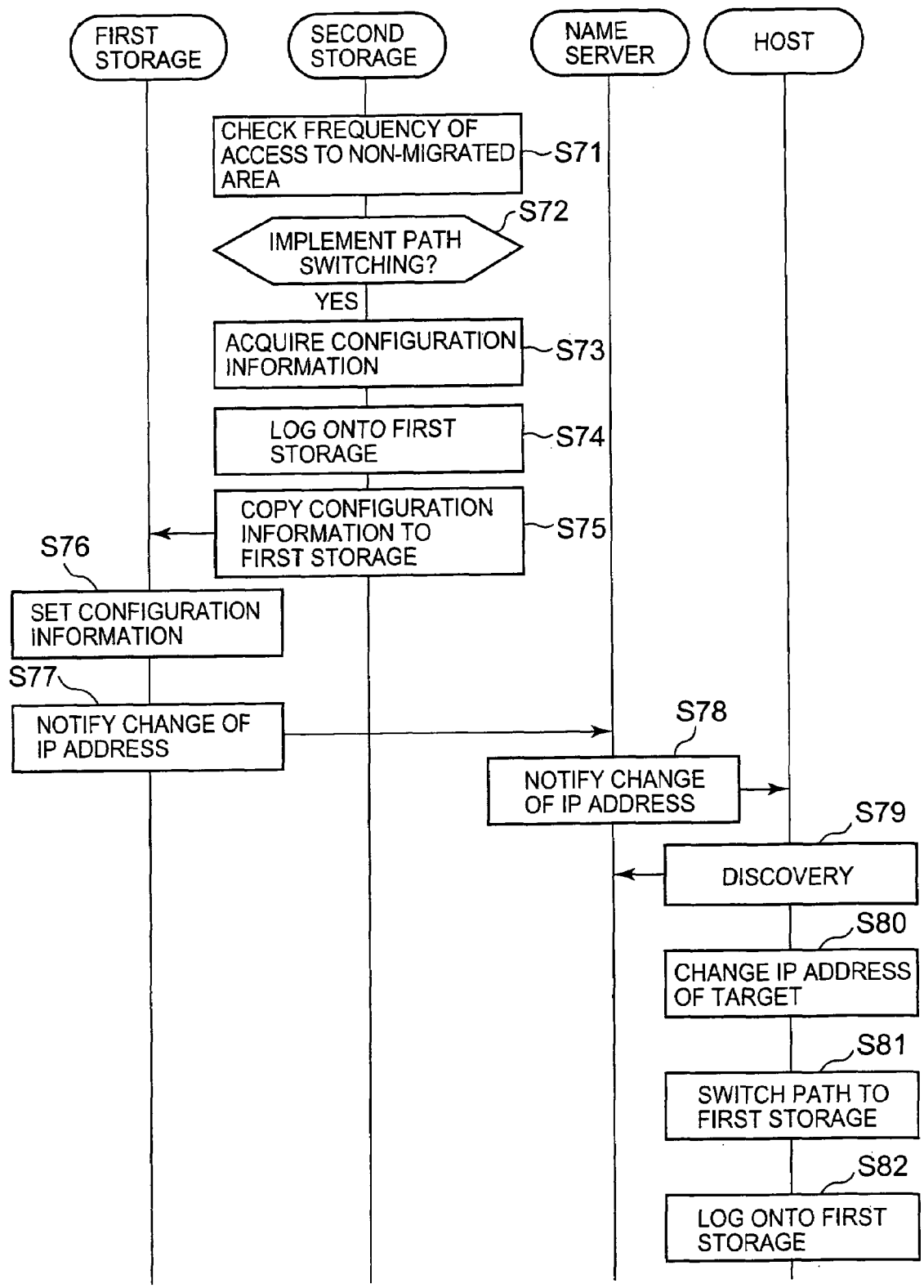
FIG. 12 is a sequence flowchart showing the state of switching the path to the storage device of the migration source based on the access state to the non-migrated area.

FIG. 12 is a sequence showing a state of reswitching the access destination of the host 10 from the second storage device 200 to the first storage device 100. The second storage device 200, as explained together with FIG. 10, checks the frequency of access by the host 10 to the non-migrated area (S71), and, when access in excess of the prescribed number C1 is confirmed (S72: YES), commences the path switching processing.

Foremost, the second storage device 200 acquires its personal configuration information (S73), logs onto the first storage device 100 (S74), and copies the configuration information to the first storage device 100 (S75).

The first storage device 100 personally sets the configuration information copied by the second storage device 200 (S76), and notifies the name server 30 to the effect that the IP address of the target has been changed (S77). When the name server 30 receives this IP address change notification, it updates the storage management table T1, and notifies the host 10 of the change of IP address (S78).

The host 10 commences discovery upon receiving the notification from the name server 30 (S79), acquires the new IP address of the target from the name server 30, and changes the IP address of the access destination (S80). Thereby, the access destination of the host 10 is switched from the second storage device 200 to the first storage device 100 (S81), and the host 10 logs onto the first storage device 100 (S82) so as to read and write data.

Figure 13:
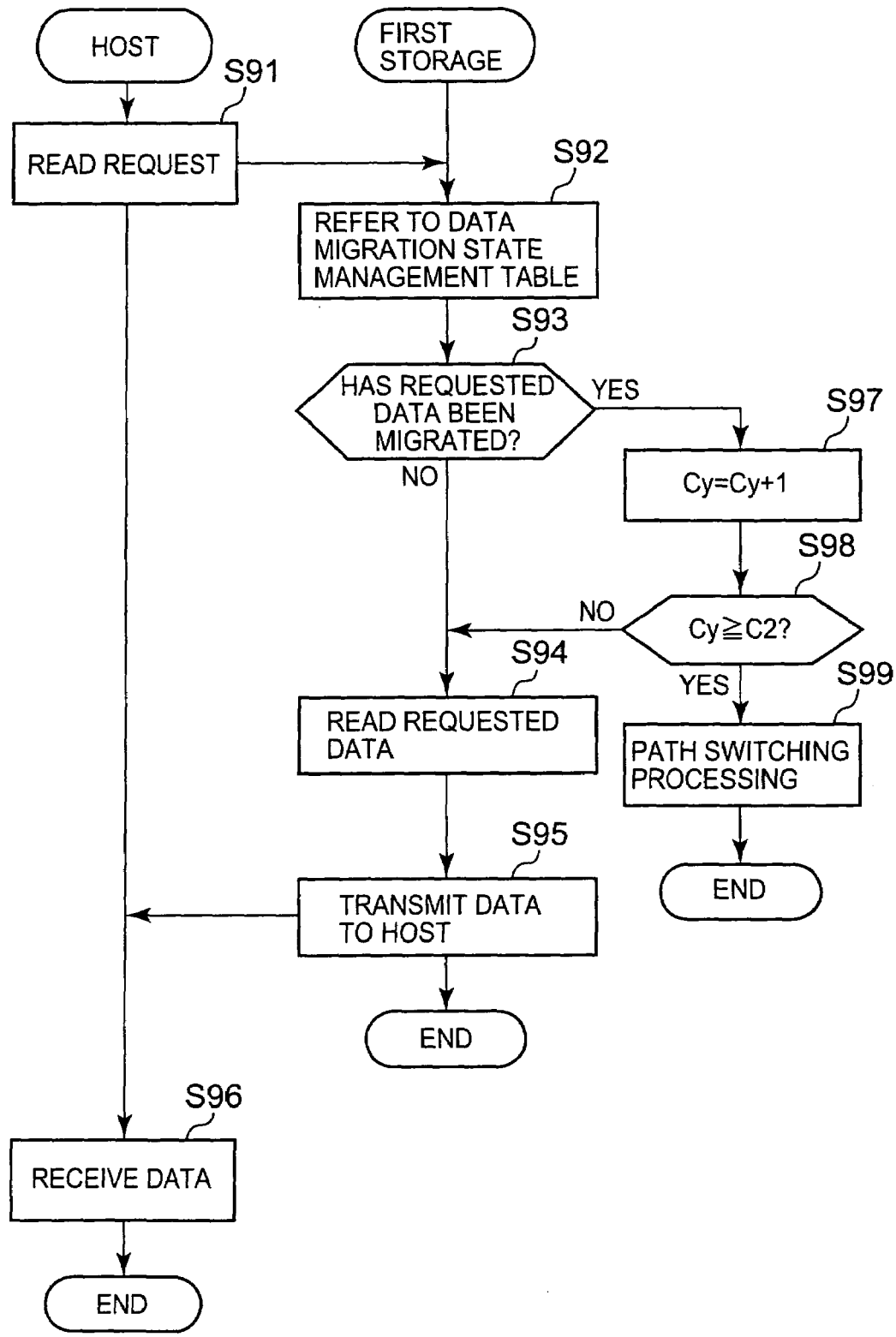
FIG. 13 is a flowchart showing the read processing to the migrated area.

FIG. 13 is a flowchart showing the path switching processing to the executed by the first storage device 100. When the host 10 issues a read request (S91), the first storage device 100 refers to the data migration state management table T2 (S92), and determines whether the requested data has been migrated to the second storage device 200 (S93).

When the requested data has not yet been migrated to the second storage device 200 (S93: NO), the first storage device 100 reads the requested data (S94), and transmits this to the host 10 (S95). The host 10 receives data from the first storage device 100, and stores this in a local memory.

Contrarily, when the data requested from the host 10 has been migrated to the second storage device 200 (S93: YES), the first storage device 100 increments 1 to the counter Cy for counting the number of accesses to the migrated area (S97). And, the first storage device 100 determines whether the number of accesses (Cy) to the migrated area has reached a prescribed value C2 (S98).

When the number of accesses (Cy) to the migrated area has not reached the prescribed value C2 (S98: NO), the first storage device 100 reads data from its own volume and transmits this to the host 10 (S94, S95).

Meanwhile, when the number of accesses (Cy) to the migrated area has reached the prescribed value C2 (S98: YES), the first storage device 100 commences the path switching processing (S99). This path switching processing, as described above, may be performed by changing the IP address of the target to the address of the switching destination, and notifying the name server 30.

As described above, as a result of reswitching the access path switched to the first storage device 100 back to the second storage device 200, the data migrated to the second storage device 200 can be utilized. And, for example, when the second storage device 200 comprises a high-performance disk drive 261 such as an FC disk or a high-capacity cache memory 230 and so on, data can be provided to the host 10 by utilizing the high performance of the second storage device 200, and the response of the storage system can be improved thereby.

Further, by switching the access destination of the host 10 between the second storage device 200 of the migration destination and the first storage device 100 of the migration source based on the data migration state of the volume (how much data has been migrated) and the access state of the host 10 (access in excess of a prescribed frequency to the non-migrated area or migrated area), the generation of redundant I/O operations can be suppressed, and the response of the storage system can be improved by preventing the frequent switching of the access destination.

Figure 14:
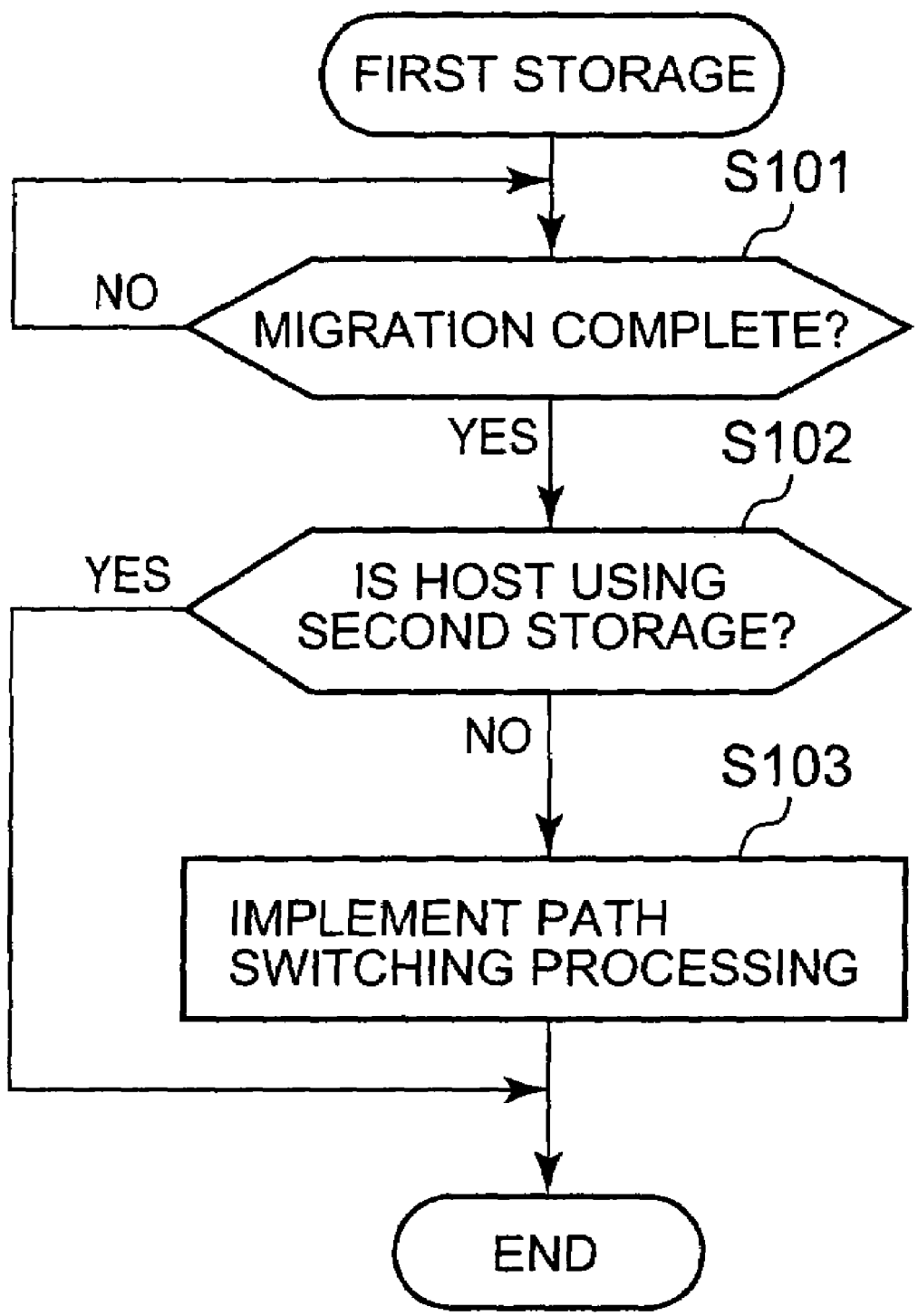
FIG. 14 is a flowchart of the path switching processing to be implemented after the completion of data migration.

FIG. 14 is a flowchart showing the path switching processing to be executed with the first storage device 100 after the completion of data migration. The first storage device 100 monitors whether the data migration is complete (S101), and, when the data migration is complete (S101: YES), it determines whether the access destination of the host 10 is the second storage device 200 (S102).

The determination of such current access destination, for example, may also be made by determining whether the configuration information of the first storage device 100 has been rewritten by the second storage device 200.

The first storage device 100 ends the processing routine when the current access destination of the host 10 is the second storage device 200 (S102: YES). Contrarily, when the access destination of the host 10 is the first storage device 100 (S102: NO), the first storage device 100 switches the access destination of the host 10 to the second storage device 200, and executed path switching processing (S103). As described above, after the completion of data migration, by inspecting the access destination of the host 10 and switching it to the second storage device 200, after the completion of data migration, data can be provided from the second storage device 200 of the data migration destination to the host 10.

In the present embodiment, the foregoing constitution yields the following effects. In the present embodiment, the access destination of the host 10 is switched to the first storage device 100 based on the access state to the non-migrated area in which data has not yet been migrated from the migration source volume of the first storage device 100 to the migration destination volume of the second storage device 200.

Therefore, the generation of redundant I/O regarding the non-migrated data can be suppressed, the response of the storage system can be improved, and the increase of network traffic can be prevented. In particular, for example, as in video distribution or the like, when the host 10 is to perform information processing with continuous data, it is possible to prevent the continuous readout of data existing in the non-migrated area, and the response can be improved thereby.

In the present embodiment, the access destination of the host 10 is switched from the first storage device 100 to the second storage device 200 based on the access state to the migrated area in which data has been migrated to the second storage device 200 among the access requests from the host 10 to the first storage device 100. Therefore, data that has already been migrated can be provided from the second storage device 200 to the host 10, and the second storage device 200 will be able to exhibit its performance. And, in the present embodiment, since the storage device of the migration source and migration destination can be suitably switched based on the data migration state and the access state data of the host, deterioration of the response can be prevented while performing data migration.

In the present embodiment, when the data migration is complete, the access destination of the host 10 is confirmed as whether it is the first storage device 100 or the second storage device 200, and, when the access destination of the host 10 is the first storage device 100, the access destination of the host 10 is switched to the second storage device 200. Therefore, after the completion of data migration, data can be provided from the second storage device 200 to the host 10.

In the present embodiment, the access destination of the host 10 is switched by employing the discovery based on iSCSI. Therefore, there is no need to provide a special function on the host 10 side for switching the access destination, and the response of the storage system can be improved with a relatively simple constitution.

2. Second Embodiment

Figure 15:
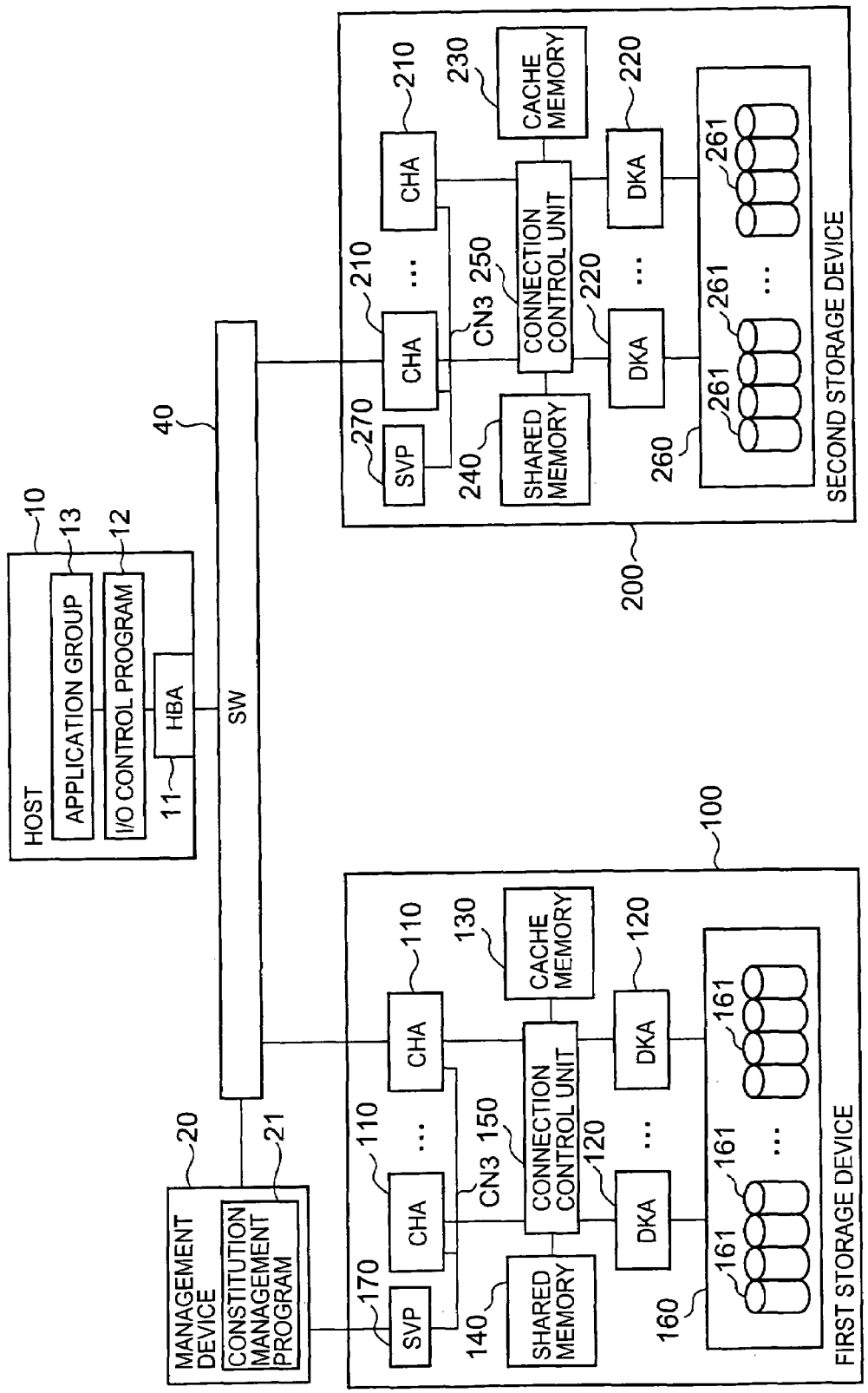
FIG. 15 is a block diagram showing the schematic constitution of the storage system of the second embodiment.

The second embodiment is explained with reference to FIG. 15 to FIG. 17. In the present embodiment, the name server 30 is not used. FIG. 15 is a block diagram showing the overall constitution of the storage system pertaining to this embodiment. In the present embodiment, the point of the name server 30 being omitted differs from the first embodiment.

Figure 16:
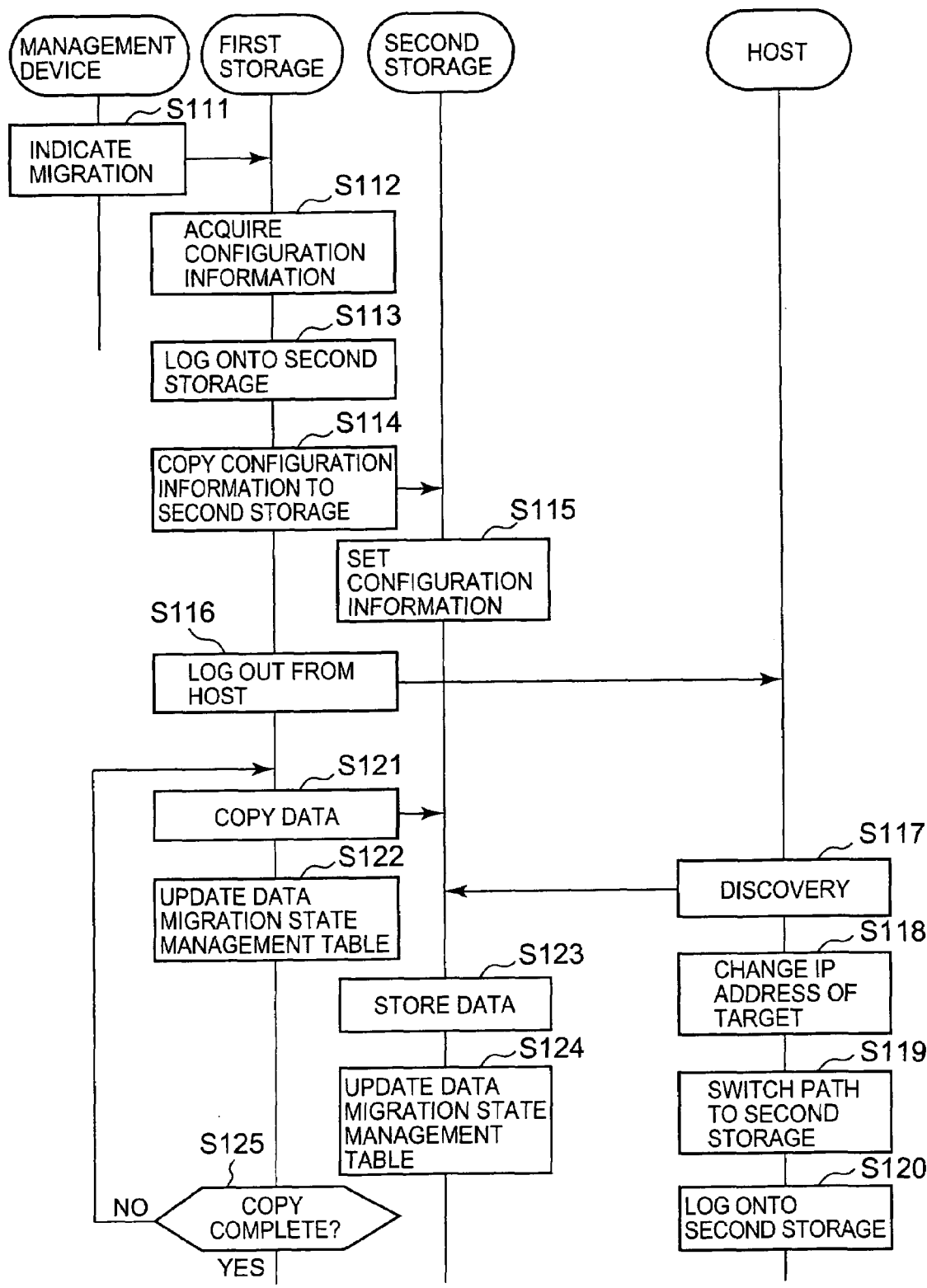
FIG. 16 is a sequence flowchart showing the overall data migration.

FIG. 16 is a sequence showing the overall processing of data migration. When a user designates the start of migration to the first storage device 100 via the management device 20 (S111), the first storage device 100 acquires its own configuration information (S112), logs onto the second storage device 200 (S113), and copies this configuration information to the second storage device 200 (S114). The second storage device 200 personally sets this configuration information, and associates the IP address of the second storage device 200 with the target name (S115).

Next, in the present embodiment, the first storage device 100 logs out from the host 10 (S116). When the host 10 detects the logout of the first storage device 100, it commences discovery (S117), and acquires the new IP address of the target from the second storage device 200. And, the host 10 rewrites the IP address set in the access destination information with the IP address of the second storage device 200 (S118), switches the access destination to the second storage device 200 (S119), and logs onto the second storage device 200 (S120).

Figure 17:
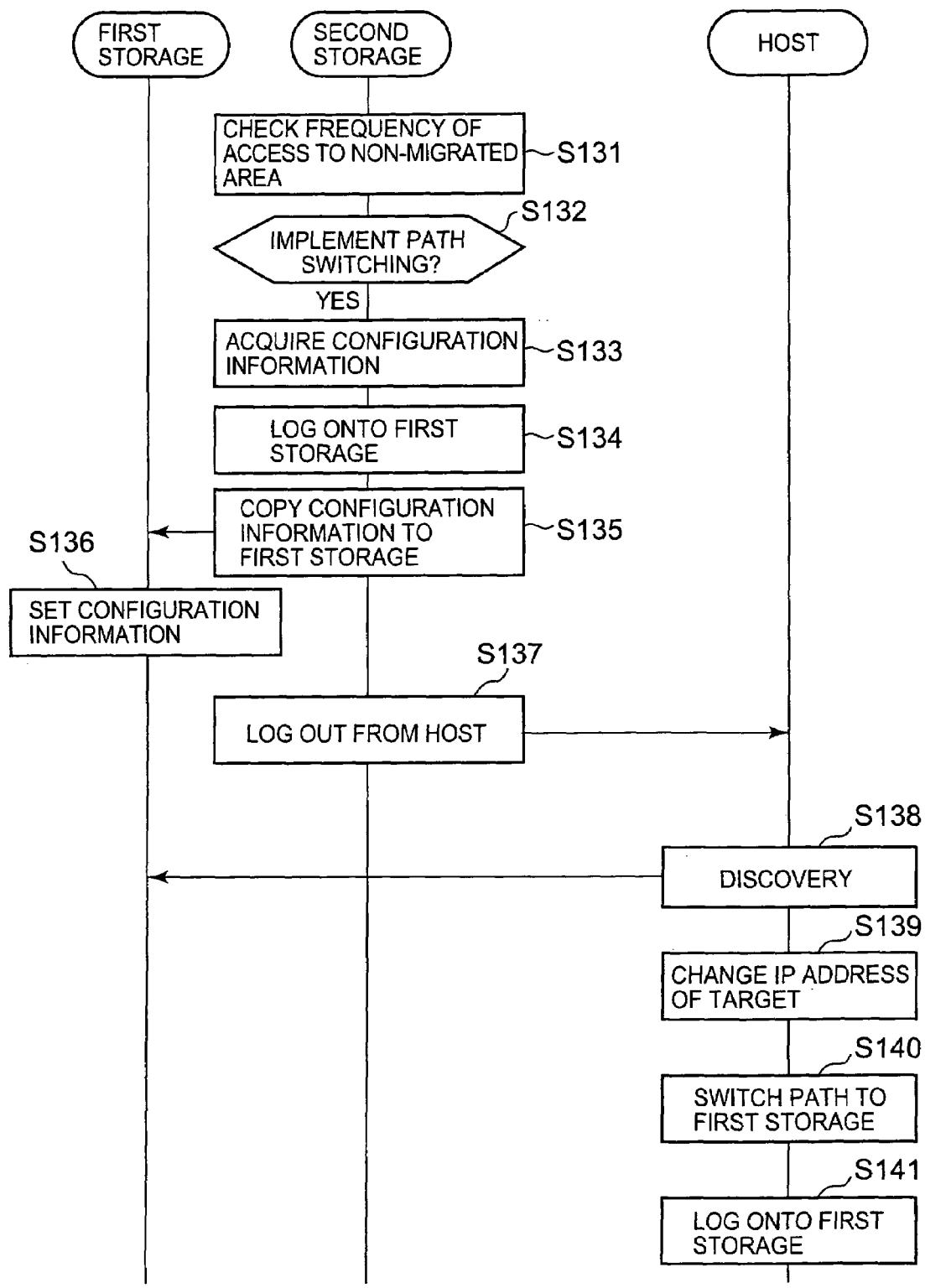
FIG. 17 is a sequence flowchart showing the state of switching the path from the storage device of the migration destination to the storage device of the migration source.

FIG. 17 is a sequence showing the state of switching the access destination of the host 10 from the second storage device 200 to the first storage device 100. The second storage device 200 checks the frequency of access by the host 10 to the non-migrated area (S131), and, when access in excess of a prescribed number C1 is confirmed (S132: YES), it commences path switching processing.

The second storage device 200 acquires its own configuration information (S133), logs onto the first storage device 100 (S134), and copies the configuration information to the first storage device 100 (S135).

The first storage device 100 personally sets the configuration information copied by the second storage device 200 (S136). Meanwhile, the second storage device 200 logs out from the host 10 (S137).

The host 10, upon the second storage device 200 logging out, commences discovery (S138), acquires the new IP address of the target from the first storage device 100, and changes the IP address of the access destination (S139). Thereby, the access destination of the host 10 is switched from the second storage device 200 to the first storage device 100 (S140), and the host 10 logs onto the first storage device 100 to read and write data (S141).

As described above, the present invention can also be employed in a storage system that does not comprise the name server 30.

3. Third Embodiment

Figure 18:
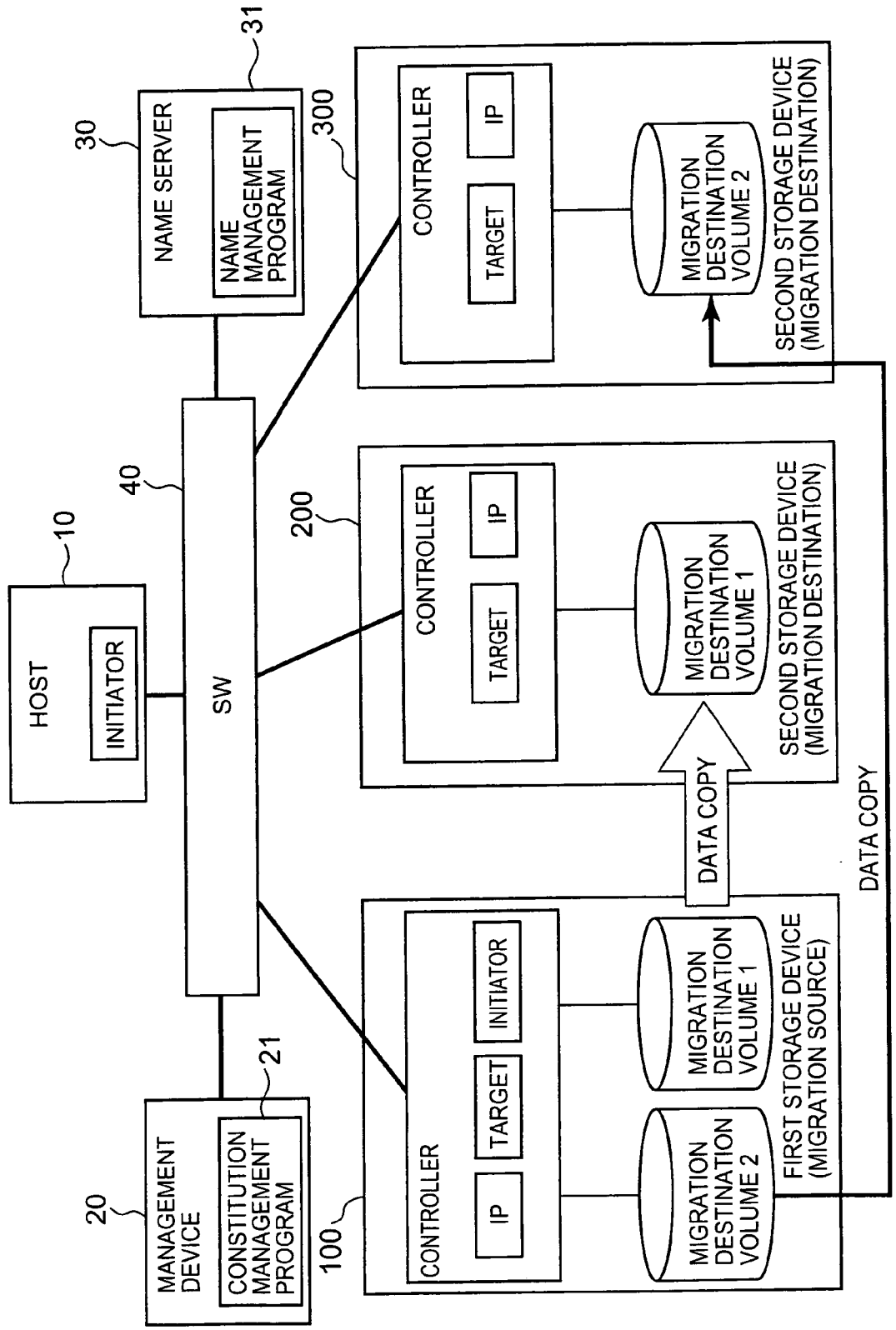
FIG. 18 is an explanatory diagram showing a frame format of the storage system of the third embodiment.

The third embodiment is explained with reference to FIG. 18. In the present embodiment, a plurality of data migration processes is conducted independently. FIG. 18 is an explanatory diagram showing a frame format of the schematic constitution of the storage system of this embodiment.

This storage system has one migration source storage device 100, and a plurality of migration destination storage devices 200, 300. The first storage device 100 comprises a plurality of migration destination volume. One migration source volume forms a copy pair with the migration destination volume of the second storage device 200, and the other migration source volume forms a copy pair with the migration destination volume of the third storage device 300.

A plurality of data migration processes, for example, can be performed in two ways. One method is to perform each data migration process via serial processing, and the other method is to perform one data migration process, and, after the completion thereof, to subsequently start the other data migration process. Either method may be adopted.

4. Fourth Embodiment

Figure 19:
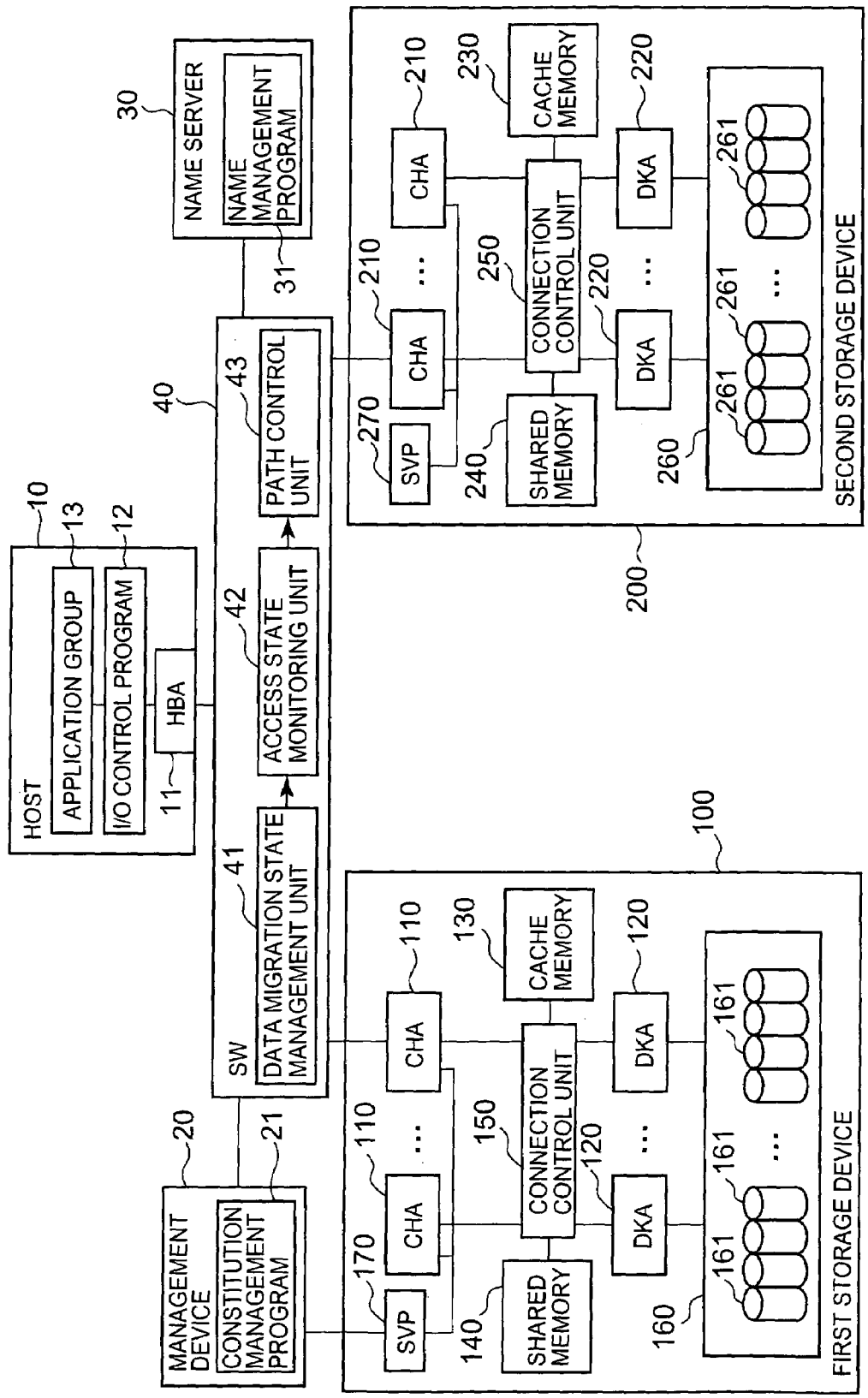
FIG. 19 is a block diagram showing a schematic of the storage device of the fourth embodiment.

The fourth embodiment is explained with reference to FIG. 19. In this embodiment, a switch 40 is used to manage the data migration state and switch the access destination of the host 10. FIG. 19 is a block diagram showing the schematic constitution of the storage device pertaining to this embodiment.

The switch 40, for example, may include a data migration state management unit 41, an access state monitoring unit 42, and a path control unit 43.

The data migration state management unit 41 acquires and manages information relating to the data migration state from the first storage device 100 or the second storage device 200. The access state monitoring unit 42 monitors whether the access request from the host 10 is an access request to the non-migrated area or an access request to the migrated area. The access state monitoring unit 42 is used to realize the respective functions of the first switching indication unit and second switching indication unit, and, when the access request to the non-migrated area exceeds the prescribed number Cx, or, when the access request to the migrated area exceeds the prescribed number Cy, it designates the switching of the path. The path control unit 43 switches the access destination of the host 10 based on the designated from the access state monitoring unit 42.

Incidentally, instead of providing the data migration state management unit 41 to the switch 40, data migration state management unit may be provided to either the first storage device 100 or the second storage device 200. Here, the data migration state management unit provided to either the storage device 100 or 200 is able to notify the data migration state in accordance with the inquiry from the access state monitoring unit 42 of the switch 40.

Further, in the present embodiment, although the name server 30 is provided, the access destination of the host 10 can be switched without having to go through the name server 30. Therefore, the name server 30 may be omitted.

Incidentally, the present invention is not limited to the foregoing embodiments. Those skilled in the art may make various additions or modifications within the scope of the present invention. For example, those skilled in the art may suitably combine the respective embodiments described above.

What is claimed is:

1. A storage system in which a first storage device, a second storage device and a host device are mutually connected communicably, comprising:
    a data migration unit for migrating data stored in a first volume of said first storage device to a second volume of said second storage device;
    a data migration state management unit for managing a migration state of data from said first volume to said second volume;
    a first access request processing unit for processing an access request from said host device to said second volume;
    a first switching indication unit for switching an access destination of said host device to said first storage device based on an access state to a non-migrated area in which data has not yet been migrated from said first volume to said second volume; and
    wherein said first switching indication unit switches the access destination of said host device to said first storage device when the frequency of access from said host device to said non-migrated area reaches a first prescribed value.

2. A storage system according to claim 1, wherein said first access request processing unit is capable of processing the access request from said host device while said data migration unit is migrating data from said first volume to said second volume.

3. A storage system according to claim 1, wherein said first access request processing unit acquires data from said second volume and provides this to said host device when the access request from said host device is an access request to a migrated area in which data has been migrated to said second volume, and acquires data from said first volume and provides this to said host device when the access request from said host device is an access request to said non-migrated area.

4. A storage system according to claim 1, further comprising:
    a second access request processing unit for processing the access request from said host device to said first volume; and
    a second switching indication unit for switching the access destination of said host device from said first storage device to said second storage device based on the access state to the migrated area in which data has been migrated to said second volume among the access requests from said host device to said first volume.

5. A storage system according to claim 4, wherein, after said data migration unit completes the data migration, said second switching indication unit confirms whether the access destination of said host device is said first storage device or said second storage device, and switches the access destination of said host device to said second storage device when the access destination of said host device is said first storage device.

6. A storage system according to claim 4, wherein said second switching indication unit switches the access destination of said host device to said second storage device when the frequency of access from said host device to said migrated area reaches a second prescribed value.

7. A storage system according to claim 1, wherein said first switching indication unit switches the access destination of said host device from said second storage device to said first storage device by copying a second constitution information of said second storage device to said first storage device, rewriting a first constitution information of said first storage device with said second constitution information, and providing a trigger signal for urging the redetection of the access destination to said host device.

8. A storage system according to claim 7, further comprising a storage management device for transmitting said trigger signal to said host device, wherein said storage management device transmits said trigger signal to said host device by notifying said storage management device to the effect that said first constitution information of said first storage device has been rewritten with said second constitution information.

9. A storage system according to claim 7, wherein said trigger signal is provided to said host device by logically disconnecting the connection between said second storage device and said host device.

10. A storage system according to claim 1, wherein said first storage device, said second storage device and said host device are mutually connected with iSCSI (internet Small Computer System Interface).

11. A storage system according to claim 4, wherein said first switching indication unit is provided to said second storage device, and said second switching indication unit is provided to said first storage device.

12. A storage system according to claim 1, wherein said first storage device, said second storage device and said host device are mutually connected in a two-way communicable manner via a switch; and
    said switch is provided with at least said data migration state management unit and said first switching indication unit.

13. A data migration method for migrating data from a first storage device to a second storage device in a storage system in which the first storage device, the second storage device and a host device are mutually connected communicably, comprising:
    a first switching step of switching an access destination of said host device from said first storage device to said second storage device;
    a data migration step of migrating data stored in a first volume of said first storage device to a second volume of said second storage device;
    a management step of managing a data migration state of data from said first volume to said second volume;
    an access request processing step of processing an access request from said host device to said second volume;
    a step of detecting an access state to a non-migrated area in which data has not yet been migrated from said first volume to said second volume;
    a second switching step of switching the access destination of said host device from said second storage device to said first storage device based on the access state to said detected non-migrated area; and
    wherein said second switching step switches the access destination of said host device from said second storage device to said first storage device when the frequency of access from said host device to said non-migrated area reaches a first prescribed value.

14. A data migration method for a storage system according to claim 13, further comprising a third switching step after said second switching step, wherein said third switching step reswitches the access destination of said host device from said first storage device to said second storage device based on the access state to the migrated area in which data has been migrated to said second volume among the access requests from said host device to said first volume.

15. A data migration method for a storage system according to claim 14, further comprising a fourth switching step after said third switching step, wherein, when said data migration is complete, said fourth switching step confirms whether the access destination of said host device is said first storage device or said second storage device, and switches the access destination of said host device to said second storage device when the access destination of said host device is said first storage device.

16. A data migration method for a storage system according to claim 13, wherein said second switching step switches the access destination of said host device from said first storage device to said second storage device by copying the first constitution information of said first storage device to said second storage device, rewriting the second constitution information of said second storage device with said first constitution information, and providing a trigger signal for urging the redetection of the access destination to said host device.

17. A data migration method for a storage system according to claim 16, wherein said trigger signal is provided to said host device by logically disconnecting the connection between said second storage device and said host device.

18. A storage system in which a first storage device, a second storage device and a host device are mutually connected communicably via a switch, wherein:
(1) said first storage device comprises:
a first control unit for performing data communication with the outside and data communication with a first memory device group via said switch; and
a first volume disposed on a memory area provided by said first memory device group;
(2) said second storage device comprises:
a second control unit for performing data communication with the outside and data communication with a second memory device group via said switch; and
a second volume disposed on a memory area provided by said second memory device group;
(3) a name server comprises a name management unit for respectively managing a target name and IP (Internet Protocol) address of said first storage device and said second storage device;
(4-1) said first storage device and/or said second storage device is provided with a data migration unit for migrating data stored in said first volume to said second volume;
(4-2) said first storage device and said second storage device are respectively provided with a data migration state management unit for managing a migration state of data from said first volume to said second volume;
(4-3) said second storage device is provided with a first switching indication unit for switching an access destination of said host device from said second storage device to said first storage device based on when the frequency of access from said host device to said non-migrated area reaches a first prescribed value;
(4-4) said first storage device is provided with a second switching indication unit for switching an access destination of said host device from said first storage device to said second storage device based on when the frequency of access from said host device to said migrated area reaches a second prescribed value;
(5-1) said first switching indication unit and said second switching indication unit copy a constitution information (including the device name, target name (iSCSI name), and LUN (Logical Unit Number) of the access target) of the storage device to become the switching source to the storage device to become the switching destination, and rewrite the target name of the storage device to become said switching destination;
(5-2) change of IP address corresponding to said target name is notified from the storage device to become said switching destination to said name server; and
(5-3) said name server urges said host device to perform a discovery of the storage device.

* * * * *